US012641472B2

(12) United States Patent  (10) Patent No.:  US 12,641,472 B2
Hirzallah et al.  (45) Date of Patent:  May 26, 2026

(54) POSITIONING MODEL VALIDITY CONDITION SIGNALING AND INDICATION

(71) Applicant: QUALCOMM Incorporated, San Diego, CA (US)

(72) Inventors: Mohammed Ali Mohammed Hirzallah, San Diego, CA (US); Srinivas Yerramalli, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 18/187,623

(22) Filed: Mar. 21, 2023

(65) Prior Publication Data

US 2024/0323745 A1  Sep. 26, 2024

(51) Int. Cl.
*H04W 28/00* (2009.01)
*H04W 28/02* (2009.01)
*H04W 64/00* (2009.01)

(52) U.S. Cl.
CPC ... *H04W 28/0226* (2013.01); *H04W 28/0215* (2013.01); *H04W 64/003* (2013.01)

(58) Field of Classification Search
CPC ......... H04W 28/0226; H04W 28/0215; H04W 64/003
See application file for complete search history.

(56) References Cited

U.S. PATENT DOCUMENTS

| | | | | |
|---|---|---|---|---|
| 9,763,050 B2 * | 9/2017 | Belghoul | ............... | H04W 4/02 |
| 11,513,583 B2 | 11/2022 | He et al. | | |
| 2017/0006426 A1 * | 1/2017 | Fu | ......................... | G01S 5/0236 |
| 2024/0085515 A1 * | 3/2024 | Zorgui | ................. | G01S 5/0252 |

FOREIGN PATENT DOCUMENTS

| | | |
|---|---|---|
| CN | 115311422 A | 11/2022 |
| WO | 2022060493 A1 | 3/2022 |

OTHER PUBLICATIONS

International Search Report and Written Opinion—PCT/US2024/019592—ISA/EPO—Jun. 25, 2024.

(Continued)

*Primary Examiner* — Erika A Washington
(74) *Attorney, Agent, or Firm* — Procopio, Cory, Hargreaves & Savitch LLP

(57) ABSTRACT

A wireless device may select a positioning model from a set of positioning models supported by the wireless device based on a set of conditions of the wireless device satisfying a set of validity conditions associated with the selected positioning model. The wireless device may receive a set of positioning signals. The wireless device may measure the set of positioning signals. The wireless device may calculate, using the selected positioning model, a set of positioning results based on the measured set of positioning signals. The wireless device may include at least one of a user equipment (UE), a network node, or a network entity. The positioning model may include an artificial intelligence machine learning (AIML) model. The set of validity conditions may relate to an environment of the wireless device for which the positioning model was trained and is known to work.

28 Claims, 12 Drawing Sheets

(56) References Cited

OTHER PUBLICATIONS

Lutchoomun W (Interdigital Inc)., et al., "Use Case Specific Aspects", 3GPP RAN WG2 Meeting #121, R2-2300697, Type Discussion, FS_NR_AIML_AIR, 3rd Generation Partnership Project, Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, Feb. 17, 2023, 5 Pages, XP052245340, p. 4.

Petric M., et al., "RSS-based SVR Models For GSM and DCS Mobile Users' Localization", Eurocon 2013, IEEE, Jul. 1, 2013, pp. 591-596, XP032497911, p. 2, lines 6-7.

TCL Communication Ltd: "Discussion on AI/ML Based Positioning Methods Selection", 3GPP TSG RAN WG2#119bis-e, R2-2210487, 3rd Generation Partnership Project, Mobile Competence Centre, 650, Route Des Lucioles, F-06921 Sophia-Antipolis Cedex, France, vol. RAN WG2, No. e-Meeting, Oct. 10, 2022-Oct. 19, 2022, Sep. 30, 2022, 4 Pages, XP052263801.

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

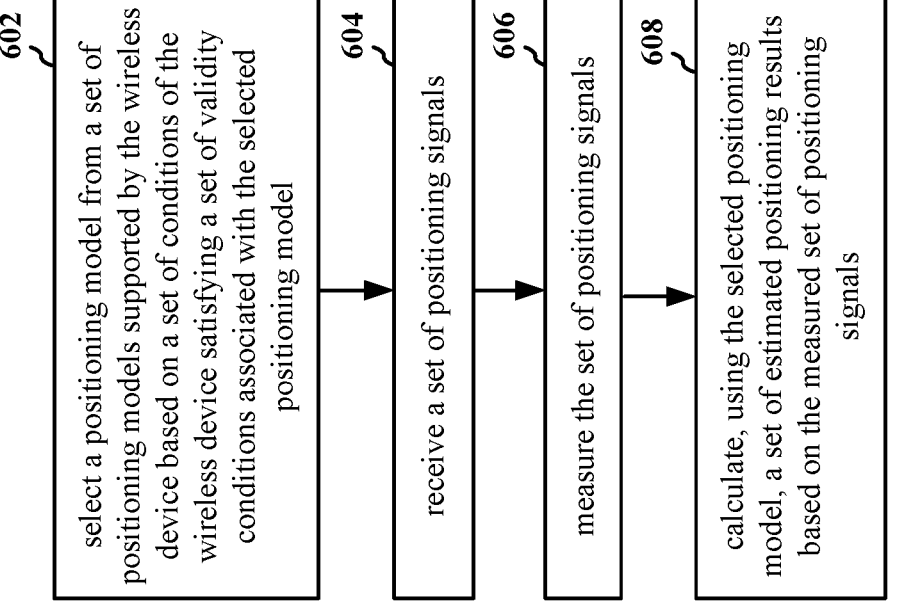

602 select a positioning model from a set of positioning models supported by the wireless device based on a set of conditions of the wireless device satisfying a set of validity conditions associated with the selected positioning model

604 receive a set of positioning signals

606 measure the set of positioning signals

608 calculate, using the selected positioning model, a set of estimated positioning results based on the measured set of positioning signals

FIG. 6

600

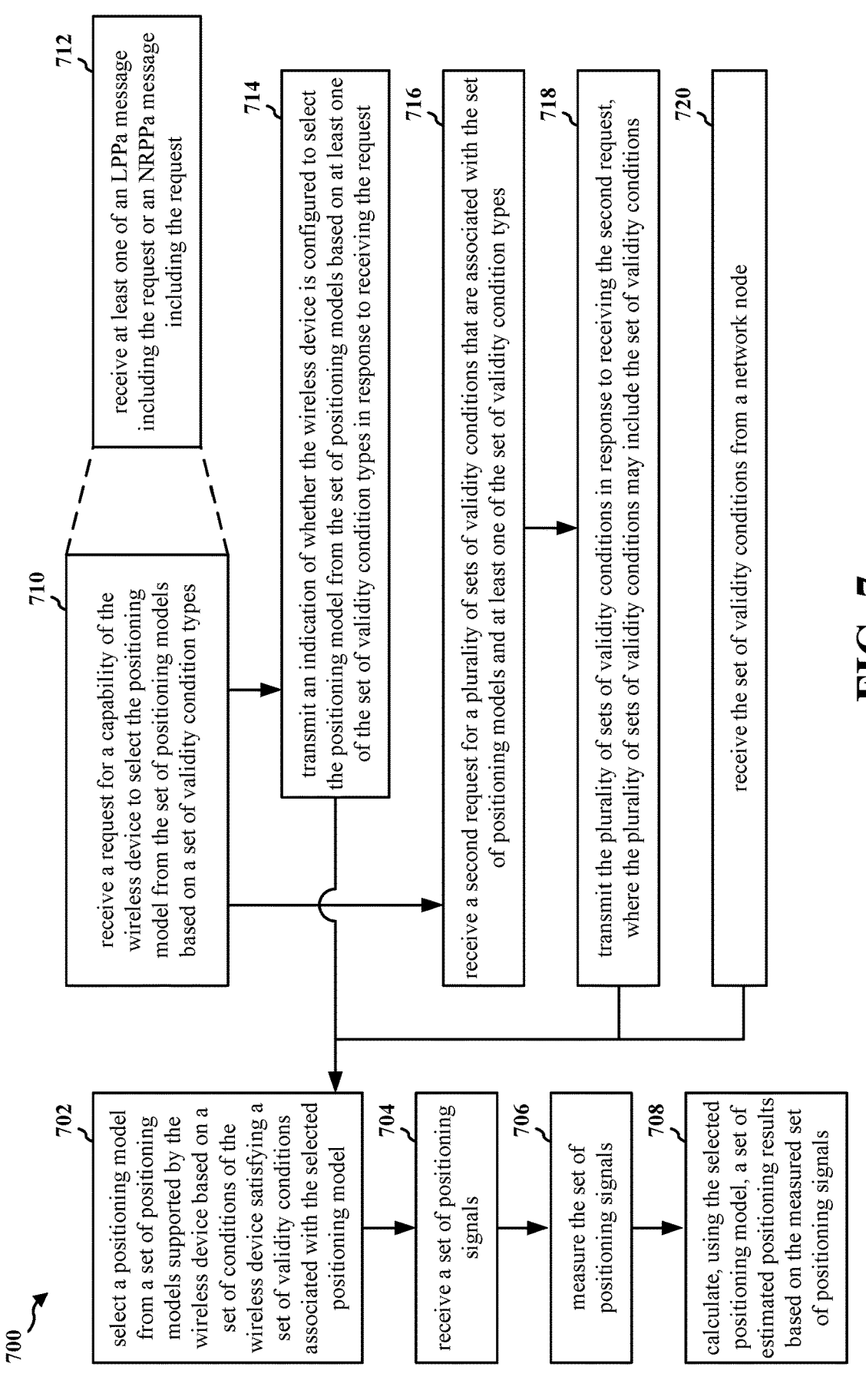

FIG. 7

712 — receive at least one of an LPPa message including the request or an NRPPa message including the request 710 — receive a request for a capability of the wireless device to select the positioning model from the set of positioning models based on a set of validity condition types 714 — transmit an indication of whether the wireless device is configured to select the positioning model from the set of positioning models based on at least one of the set of validity condition types in response to receiving the request 716 — receive a second request for a plurality of sets of validity conditions that are associated with the set of positioning models and at least one of the set of validity condition types 718 — transmit the plurality of sets of validity conditions in response to receiving the second request, where the plurality of sets of validity conditions may include the set of validity conditions 720 — receive the set of validity conditions from a network node

700

702 — select a positioning model from a set of positioning models supported by the wireless device based on a set of conditions of the wireless device satisfying a set of validity conditions associated with the selected positioning model 704 — receive a set of positioning signals 706 — measure the set of positioning signals 708 — calculate, using the selected positioning model, a set of estimated positioning results based on the measured set of positioning signals

POSITIONING MODEL VALIDITY CONDITION SIGNALING AND INDICATION

TECHNICAL FIELD

The present disclosure relates generally to communication systems, and more particularly, to a positioning system that uses positioning models having validity conditions for use of the positioning models.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new standards associated with latency, reliability, security, scalability (e.g., with Internet of Things (IoT)), and other standards. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. It may be beneficial to have further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a wireless device. The apparatus may select a positioning model from a set of positioning models supported by the wireless device based on a set of conditions of the wireless device satisfying a set of validity conditions associated with the selected positioning model. The apparatus may receive a set of positioning signals. The apparatus may measure the set of positioning signals. The apparatus may calculate, using the selected positioning model, a set of positioning results based on the measured set of positioning signals.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a flowchart of a method of wireless communication.

FIG. 7 is a flowchart of a method of wireless communication.

DETAILED DESCRIPTION

Figure 1:
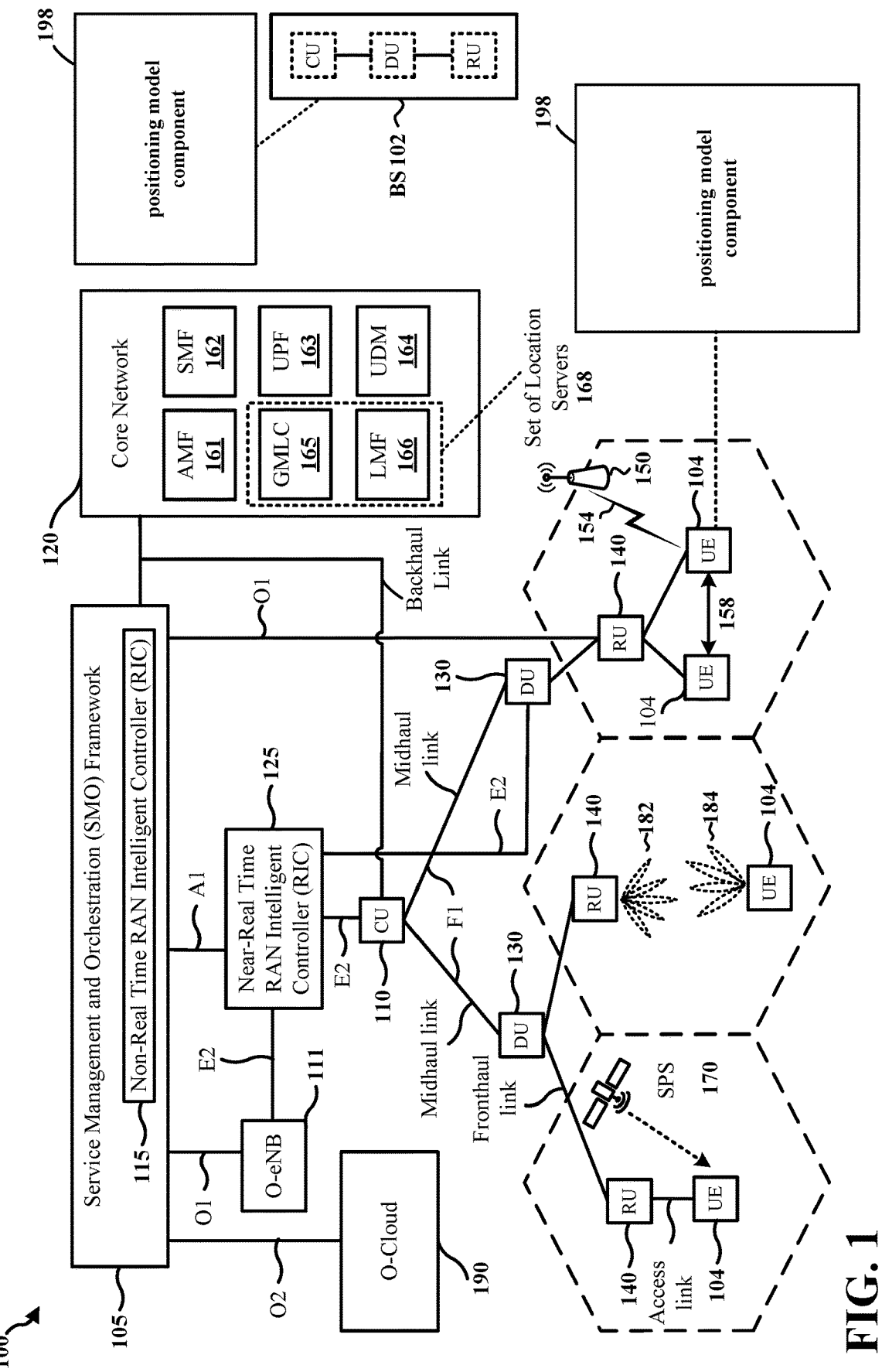
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless communication and more particularly to signaling systems for leveraging positioning models. Some aspects more specifically relate to artificial intelligence machine learning (AIML or AI/ML) positioning models. In some examples, a wireless device may select a positioning model from a set of positioning models supported by the wireless device based on a set of conditions of the wireless device satisfying a set of validity conditions associated with the selected positioning model (e.g., a positioning model appropriate for a location of the wireless device, a positioning model appropriate for RF signal propagation characteristics of the wireless device). The wireless device may receive a set of positioning signals, for example a set of positioning reference signals (PRSs) or a set of sounding reference signals (SRSs). The wireless device may measure the set of positioning signals. The wireless device may calculate, using the selected positioning model, a set of positioning results based on the measured set of positioning signals. In some aspects, the wireless device may be a user equipment (UE) or a positioning reference unit (PRU). In other aspects, the wireless device may be a network node or a network entity.

In one aspect, a validity of a positioning model (e.g., an AI/ML positioning model) may represent some combination of the following factors—applicable geographic area of the model; applicable scenarios for the model such as outdoor/indoor, base station (BS) height, clutter settings; operational time capability metrics of the model; hardware impairments that the model can handle such as ranges/distributions of UE clock drift, UE transmission reception (TX-RX) timing error, network TX-RX timing error, network sync error; resource settings that the model is designed for (e.g., number of resources, resource bandwidth (BW), resource configurations); radio propagation characteristics that the model is designed for (e.g., ranges/distributions of channel delay spread, ranges/distributions of doppler spread, ranges/distributions of angular spread, ranges/distributions of multipath characteristics); and/or mobile network operator/vendor and/or equipment that the model is tested for. In one aspect, a method of using such a positioning model may include a UE indicating to a location server its model validity information via a capability exchange in response to a request from the location server. The capability exchange may include a long-term evolution (LTE) positioning protocol (LPP) annex (LPPa) transmission between the UE and a network node. In one aspect, a starting request from a location server may be a general request for the UE to provide model validity conditions that it can support. A later request may be a detailed request for the UE to indicate if it supports a model with specific validity conditions. In an embodiment, the starting and later requests may be simultaneous. In one aspect, a method of using such a positioning model may include a UE indicating to a location server its model validity information without a request from a location server. In one aspect, a method of using such a positioning model may include a UE indicating to a location server its model validity information to a location server in response to a trigger event (e.g., the UE being within a threshold distance from the location server, the expiration of a timer, etc.). In one aspect, such a trigger event may be predefined and/or may be provided by the location server to the UE. In one aspect, a method of using such a positioning model may include a network node (e.g., a next generation NG) radio access network (NG-RAN) node) may indicate to a location server its model validity information via a new radio (NR) positioning protocol (NRPP) annex (NRPPa) transmission reception point (TRP) information transfer in response to a request from a location server, in response to a trigger event, or unprompted by the location server or a trigger event (e.g., transmitted periodically). In one aspect, for a UE to indicate to a location server its positioning model validity information, the UE may first be connected to a specific network. Such a UE may download positioning model validity information from a backend over-the-top (OTT) server upon connecting with the specific network.

Particular aspects of the subject matter described in this disclosure can be implemented to realize one or more of the following potential advantages. In some examples, by providing signaling that may be used by a wireless device to select a positioning model from a plurality of positioning models based on a set of validity conditions, the described techniques can be used to select a positioning model valid for specific conditions of the wireless device or applicable to a given area that the wireless device operates in within a predetermined locality. The described techniques may also allow a location server (e.g., a location management function (LMF) to be aware of model availability for a given condition, such that the location server may dynamically activate particular positioning models as applicable to conditions associated with a wireless device performing positioning.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage standards that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and/or a velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a wireless device, such as the UE 104 or the base station 102, may have a positioning model component 198 that may be configured to select a positioning model from a set of positioning models supported by the wireless device based on a set of conditions of the wireless device satisfying a set of validity conditions associated with the selected positioning model. The positioning model component 198 may be configured to receive a set of positioning signals. The positioning model component 198 may be configured to measure the set of positioning signals. The positioning model component 198 may be configured to calculate, using the selected positioning model, a set of positioning results based on the measured set of positioning signals. The positioning model component 198 may be configured to perform positioning via one of a plurality of positioning models based on an environment of the wireless device. The selected positioning model may be trained in the environment, or a similar environment, as indicated by the validity conditions associated with the wireless device.

Figures 2A, 2B, 2C, 2D:
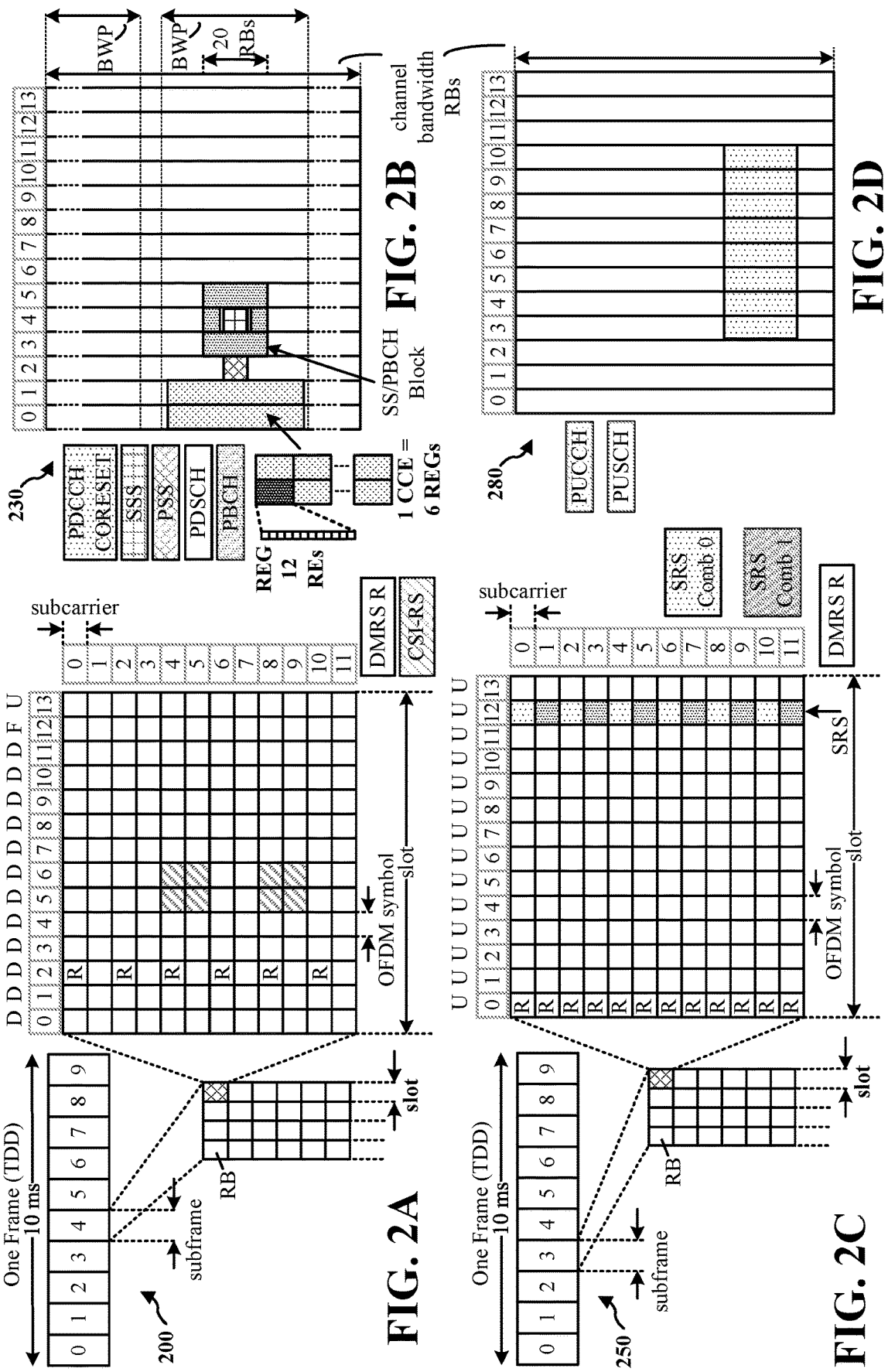
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS<br>$\Delta f = 2^\mu \cdot 15 [kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
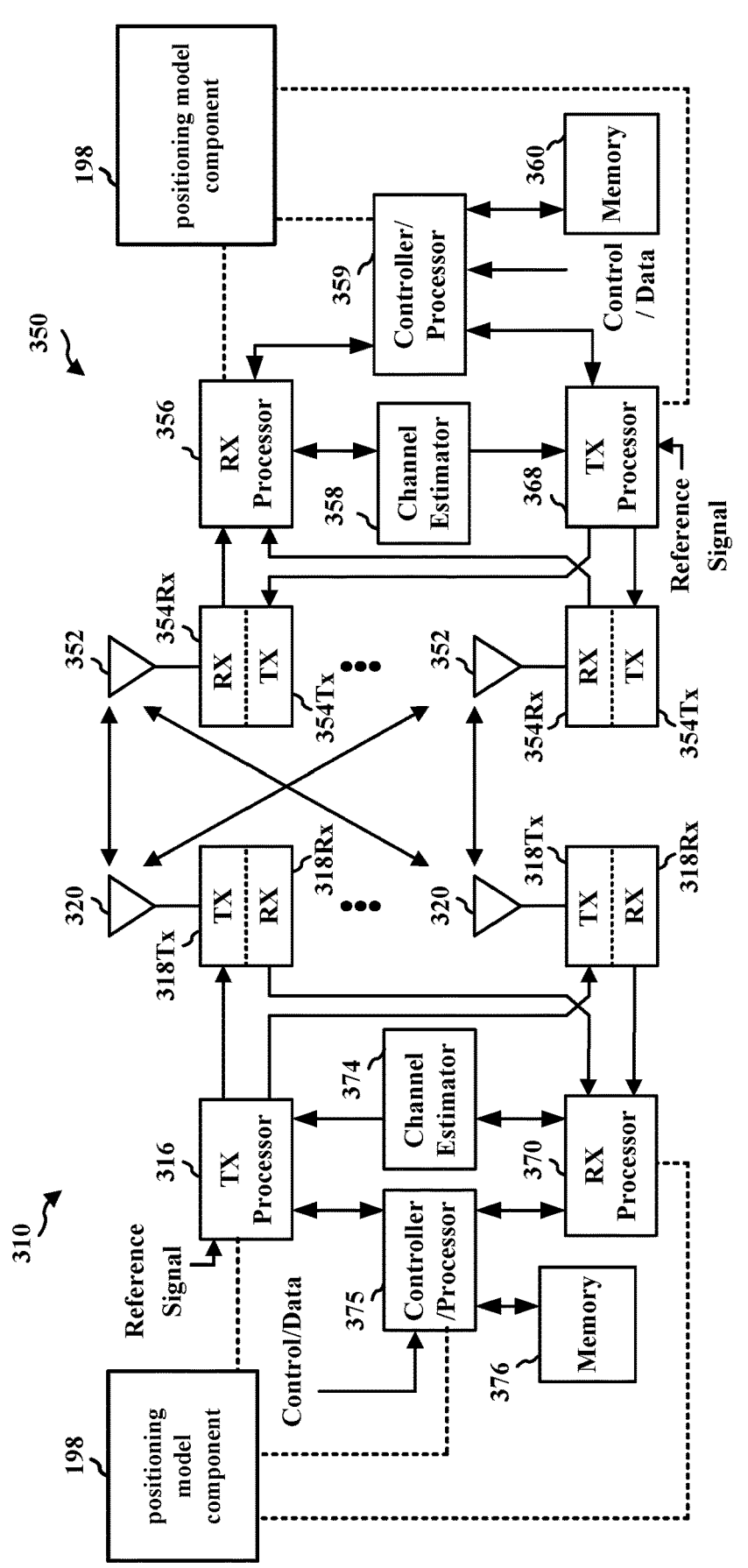
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded
and modulated symbols may then be split into parallel
streams. Each stream may then be mapped to an OFDM
subcarrier, multiplexed with a reference signal (e.g., pilot) in
the time and/or frequency domain, and then combined
together using an Inverse Fast Fourier Transform (IFFT) to
produce a physical channel carrying a time domain OFDM
symbol stream. The OFDM stream is spatially precoded to
produce multiple spatial streams. Channel estimates from a
channel estimator 374 may be used to determine the coding
and modulation scheme, as well as for spatial processing.
The channel estimate may be derived from a reference signal
and/or channel condition feedback transmitted by the UE
350. Each spatial stream may then be provided to a different
antenna 320 via a separate transmitter 318Tx. Each trans-
mitter 318Tx may modulate a radio frequency (RF) carrier
with a respective spatial stream for transmission.

At the UE 350, each receiver 354Rx receives a signal
through its respective antenna 352. Each receiver 354Rx
recovers information modulated onto an RF carrier and
provides the information to the receive (RX) processor 356.
The TX processor 368 and the RX processor 356 implement
layer 1 functionality associated with various signal process-
ing functions. The RX processor 356 may perform spatial
processing on the information to recover any spatial streams
destined for the UE 350. If multiple spatial streams are
destined for the UE 350, they may be combined by the RX
processor 356 into a single OFDM symbol stream. The RX
processor 356 then converts the OFDM symbol stream from
the time-domain to the frequency domain using a Fast
Fourier Transform (FFT). The frequency domain signal
includes a separate OFDM symbol stream for each subcar-
rier of the OFDM signal. The symbols on each subcarrier,
and the reference signal, are recovered and demodulated by
determining the most likely signal constellation points trans-
mitted by the base station 310. These soft decisions may be
based on channel estimates computed by the channel esti-
mator 358. The soft decisions are then decoded and deinter-
leaved to recover the data and control signals that were
originally transmitted by the base station 310 on the physical
channel. The data and control signals are then provided to
the controller/processor 359, which implements layer 3 and
layer 2 functionality.

The controller/processor 359 can be associated with a
memory 360 that stores program codes and data. The
memory 360 may be referred to as a computer-readable
medium. In the UL, the controller/processor 359 provides
demultiplexing between transport and logical channels,
packet reassembly, deciphering, header decompression, and
control signal processing to recover IP packets. The con-
troller/processor 359 is also responsible for error detection
using an ACK and/or NACK protocol to support HARQ
operations.

Similar to the functionality described in connection with
the DL transmission by the base station 310, the controller/
processor 359 provides RRC layer functionality associated
with system information (e.g., MIB, SIBs) acquisition, RRC
connections, and measurement reporting; PDCP layer func-
tionality associated with header compression/decompres-
sion, and security (ciphering, deciphering, integrity protec-
tion, integrity verification); RLC layer functionality
associated with the transfer of upper layer PDUs, error
correction through ARQ, concatenation, segmentation, and
reassembly of RLC SDUs, re-segmentation of RLC data
PDUs, and reordering of RLC data PDUs; and MAC layer
functionality associated with mapping between logical chan-
nels and transport channels, multiplexing of MAC SDUs onto TBs, demultiplexing of MAC SDUs from TBs, sched-
uling information reporting, error correction through
HARQ, priority handling, and logical channel prioritization.

Channel estimates derived by a channel estimator 358
from a reference signal or feedback transmitted by the base
station 310 may be used by the TX processor 368 to select
the appropriate coding and modulation schemes, and to
facilitate spatial processing. The spatial streams generated
by the TX processor 368 may be provided to different
antenna 352 via separate transmitters 354Tx. Each transmit-
ter 354Tx may modulate an RF carrier with a respective
spatial stream for transmission.

The UL transmission is processed at the base station 310
in a manner similar to that described in connection with the
receiver function at the UE 350. Each receiver 318Rx
receives a signal through its respective antenna 320. Each
receiver 318Rx recovers information modulated onto an RF
carrier and provides the information to a RX processor 370.

The controller/processor 375 can be associated with a
memory 376 that stores program codes and data. The
memory 376 may be referred to as a computer-readable
medium. In the UL, the controller/processor 375 provides
demultiplexing between transport and logical channels,
packet reassembly, deciphering, header decompression, con-
trol signal processing to recover IP packets. The controller/
processor 375 is also responsible for error detection using an
ACK and/or NACK protocol to support HARQ operations.

At least one of the TX processor 368, the RX processor
356, and the controller/processor 359 may be configured to
perform aspects in connection with the positioning model
component 198 of FIG. 1.

At least one of the TX processor 316, the RX processor
370, and the controller/processor 375 may be configured to
perform aspects in connection with the positioning model
component 198 of FIG. 1.

Figure 4:
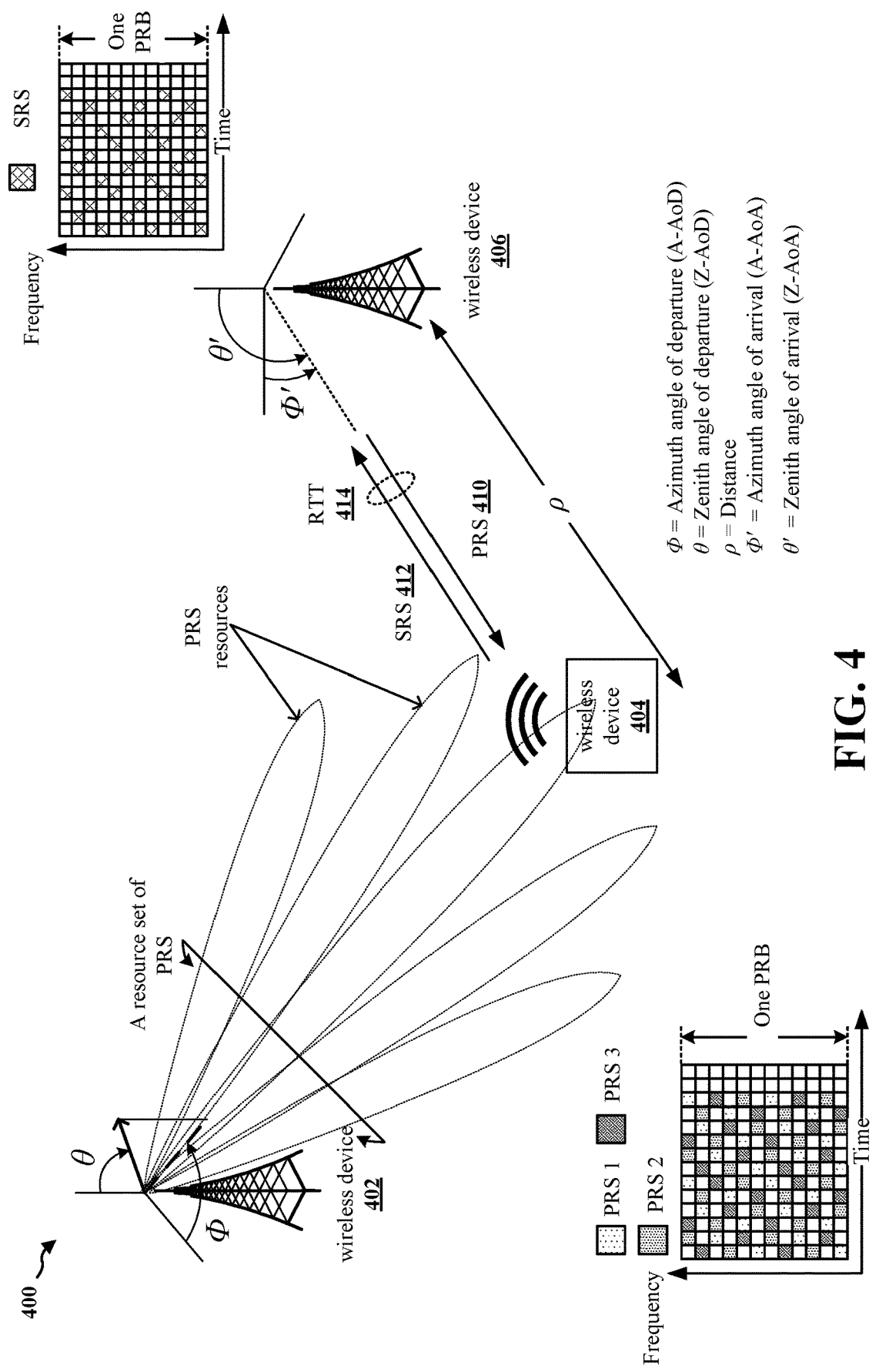
FIG. 4 is a diagram illustrating an example of a positioning based on reference signal measurements.

FIG. 4 is a diagram 400 illustrating an example of
positioning based on reference signal measurements. The
wireless device 402 may be a UE, a base station, or a
positioning reference unit (PRU). The wireless device 404
may be a UE, a base station, or a PRU. The wireless device
406 may be a UE, a base station, or a PRU. The wireless
device 402 may be referred to as a positioning target
wireless device, whose location may be calculated based on
measurements of one or more reference signals. The wire-
less device 404 and the wireless device 406 may be referred
to as positioning neighbor wireless devices, whose locations
may be known, which may be used to calculate the location
of the wireless device 402. The wireless device 404 may
transmit SRS 412 at time $T_{SRS\_TX}$ to the wireless device 406.
The wireless device 404 may receive positioning reference
signals (PRS) 410 at time $T_{PRS\_RX}$ from the wireless device
406. The SRS 412 may be an UL-SRS. The PRS 410 may
be a DL-PRS. In some aspects, the wireless device 402 may
be a TRP and the wireless device 406 may be a TRP, which
may be both configured to transmit DL-PRS to the wireless
device 404. The wireless device 404 may be a UE configured
to transmit UL-SRS to the wireless device 402 and the
wireless device 406.

The wireless device 406 may receive the SRS 412 at time
$T_{SRS\_RX}$ from the wireless device 404 and transmit the PRS
410 at time $T_{PRS\_TX}$ to the wireless device 404. The wireless
device 404 may receive the PRS 410 before transmitting the
SRS 412. The wireless device 404 may transmit the SRS 412
before receiving the PRS 410. The wireless device 404 may
transmit the SRS 412 in response to receiving the PRS 410.
The wireless device 406 may transmit the PRS 410 in
response to receiving the SRS 412. A positioning server (e.g., location server(s)168), the wireless device 404, or the wireless device 406 may determine the round-trip-time (RTT) 414 based on $\|T_{SRS\_RX} - T_{PRS\_TX}\| - \|T_{SRS\_TX} - T_{PRS\_RX}\|$. Multi-RTT positioning may make use of the Rx-Tx time difference measurements (i.e., $|T_{SRS\_TX} - T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX} - T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

A wireless device, such as a UE or a base station, may use a positioning model to estimate, or calculate, positioning results associated with a positioning target wireless device based on one or more positioning signals received by the wireless device. The positioning results may include a location of the positioning target wireless device, such as the wireless device 404, or may include an intermediate measurement that may be used to calculate or otherwise derive the location of the positioning target wireless device. An intermediate measurement may include, for example, an AoA, a TDOA, or a line-of-sight (LOS) identification (e.g., an indication of whether a line-of-sight between a first wireless device and a second wireless device is blocked). A positioning model may be generated using artificial intelligence machine learning (AIML) to train the positioning model based on a set of inputs (e.g., measurements of one or more reference signals from transmitted from, or received by, the positioning target wireless device) and a set of expected labels (e.g., a location of the positioning target wireless device, an AoA of a reference signal received by the positioning target wireless device). The positioning model may perform AIML direct positioning (calculating a location of a positioning target wireless device) using radio frequency finger prints (RFFP). The positioning model may perform AIML assisted positioning (calculating an intermediate measurement) using inputs from a plurality of TRPs.

A positioning model trained in one environment (e.g., a site, a zone, and/or or a wireless device configuration) may be accurate in calculating positioning results in a similar environment, but may not be accurate in calculating position results in an environment different from the one in which it was trained. For example, a positioning model trained by a wireless device in a factory may not be accurate when used to calculate positioning results in a warehouse, or to calculate positioning results in a shopping mall. A different environmental factor may be, for example, a different BWP for a positioning signal in the trained environment versus the BWP for a positioning signal in the environment where the positioning model is sued or a different hardware impairment for the wireless device in the trained environment versus a hardware impairment for the wireless device that is using the positioning model to calculate a set of positioning results. Some positioning models may be valid for specific conditions, and/or may be applicable to a given area within a predetermined locality. A wireless device may select a positioning model based on a set of validity conditions associated with the training environment associated with the positioning model, (e.g., the environment in which the positioning model was trained). The set of validity conditions may be represented by an indication of an applicable area, zone, scenario, environment, or time interval. If a set of conditions associated with the wireless device matches the set of validity conditions associated with the positioning model, the wireless device may use the positioning model to calculate a set of positioning results.

In some aspects, a wireless device, such as a positioning target wireless device or a positioning neighbor wireless device, may select a positioning model from a set of positioning models supported by the wireless device based on a set of conditions of the wireless device satisfying a set of validity conditions associated with the selected positioning model. The wireless device may receive a set of positioning signals. The wireless device may measure the set of positioning signals. The wireless device may calculate, using the selected positioning model, a set of positioning results based on the measured set of positioning signals.

In some aspects, a network entity, such as an LMF, may configure the positioning model, or may assist the wireless device in configuring the positioning model (e.g., by transmitting one or more validity conditions to the wireless device). The wireless device may be configured to transmit an indication to such a network entity of whether the wireless device supports a positioning model for a given environment, such as a site, a zone or a configuration of interest. The wireless device may have capability messaging and/or assistance data/info that enables a network entity configuring a positioning model to request and receive validity conditions of positioning models supported by a wireless device configured to deliver positioning results, such as a positioning target wireless device (e.g., a UE, a PRU) or a positioning neighbor wireless device (e.g., a network node, an NG-RAN node, a PRU). The network entity may become aware of positioning model availability to a given condition associated with a wireless device, and may activate an appropriate positioning model as applicable to the given condition.

As an example, a network entity configuring a positioning target wireless device and a positioning neighbor wireless device to perform positioning with one another may request each wireless device to inform the network entity of whether the wireless device supports a positioning model associated with a given environment. The network entity may be an LMF. The positioning target wireless device may be a UE. The positioning neighbor wireless device may be an NG-RAN node. The network entity may transmit a request to the positioning neighbor wireless device, asking if the positioning neighbor wireless device supports a positioning model for a site identified as "A" with a BWP of 100 MHz. The positioning neighbor wireless device may respond to the network entity with an affirmative response. The network entity may transmit a request to the positioning target wireless device, asking if the positioning target wireless device supports a positioning model for a site identified as "B" with a BWP of 100 MHz. The positioning target wireless device may respond to the network entity with an affirmative response. The network entity may then configure positioning for the positioning neighbor wireless device located in site A to perform positioning with the positioning target wireless device located in site B using the applicable positioning models.

Figure 5:
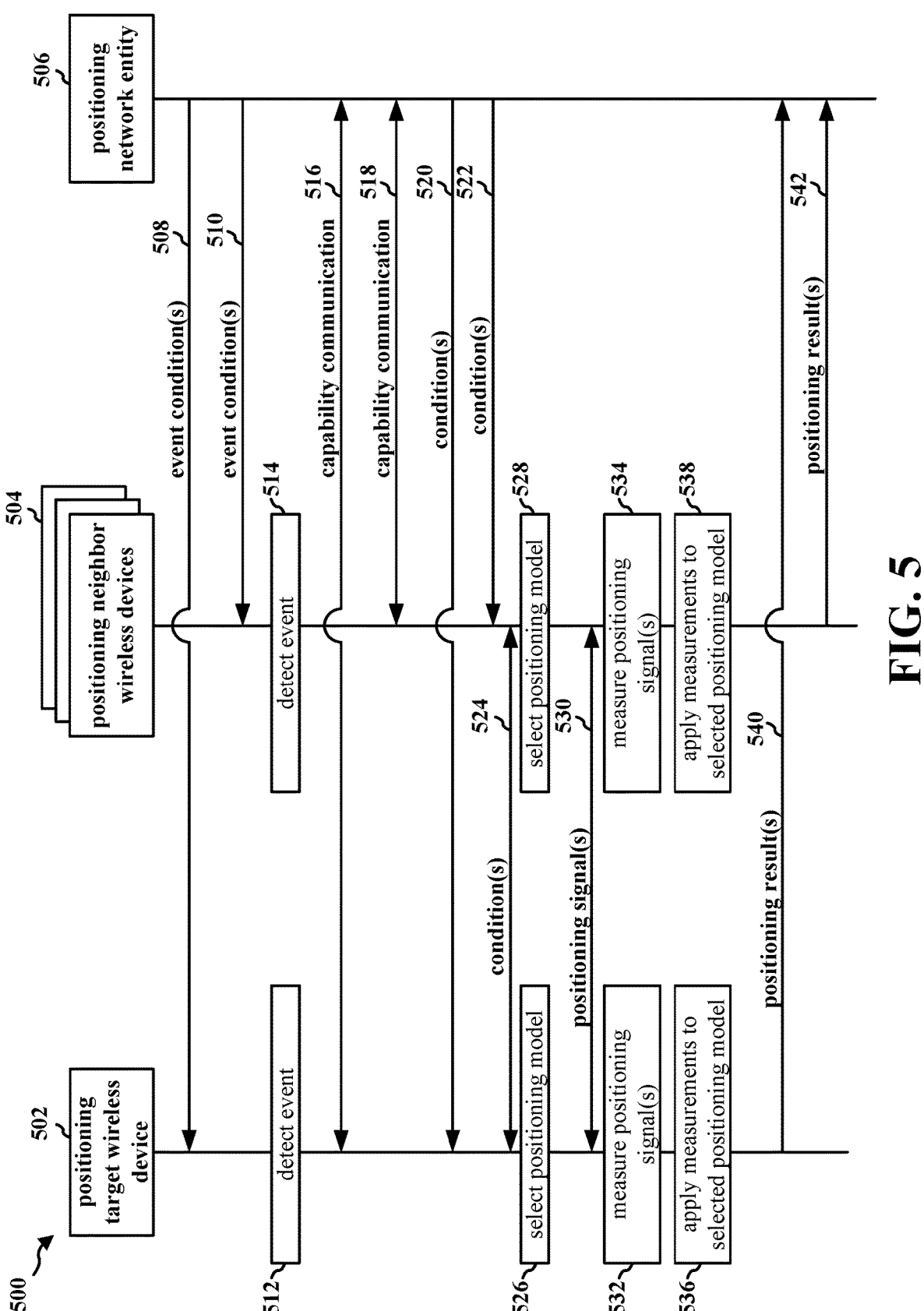
FIG. 5 is a connection flow diagram illustrating an example of a set of positioning wireless devices configured to select an applicable positioning model for use in estimating positioning results.

FIG. 5 is a connection flow diagram 500 illustrating an example of a positioning target wireless device 502 and a set of positioning neighbor wireless devices 504 configured to select an applicable positioning model for use in estimating positioning results. A positioning network entity 506 may configure the positioning method, as applicable. The positioning target wireless device 502 may be a UE, a PRU, or a network node. The set of positioning neighbor wireless devices 504 may include a UE, a PRU, or a network node. The positioning network entity 506 may include an LMF.

In some aspects, the positioning network entity 506 may transmit a set of event conditions 508 to the positioning target wireless device 502. The positioning target wireless device 502 may receive the set of event conditions 508 from the positioning network entity 506. The positioning network entity 506 may transmit the set of event conditions 508 as a long-term evolution (LTE) positioning protocol (LPP) annex (LPPa) message. In some aspects, the positioning network entity 506 may transmit the set of event conditions 508 as a new radio (NR) positioning protocol (NRPP) annex (NRPPa) broadcast procedure, which is first transmitted to a serving cell of the positioning target wireless device, which then transmits the set of event conditions 508 to the positioning target wireless device 502. The set of event conditions 508 may be transmitted as part of broadcast signaling (e.g., a positioning system information block (posSIB)) or as part of assistance data signaling. The set of event conditions 508 may include an indication of an event that may trigger the positioning target wireless device 502 to transmit its positioning capability to the positioning network entity 506. For example, the positioning target wireless device 502 may transmit information elements (IEs) of supported validity conditions and their description (e.g., within a distance X of the location or center point of the positioning target wireless device 502) to the positioning network entity 506.

In other aspects, the positioning target wireless device 502 may be preconfigured to transmit its positioning capability to the positioning network entity 506 based on a set of event conditions. For example, a standard may be defined for the positioning target wireless device 502, which indicates that the positioning target wireless device 502 transmit its positioning capability to the positioning network entity 506 based on a set of preconfigured event conditions.

At 512, the positioning target wireless device 502 may detect an event that triggers the positioning target wireless device 502 to transmit its positioning capability to the positioning network entity 506. In some aspects, an event may be a timer expiration. For example, the positioning target wireless device 502 may have a countdown timer. When the countdown timer expires, the positioning target wireless device 502 may transmit its positioning capability to the positioning network entity 506. The timer setting may be signaled by the positioning network entity 506 as part of broadcast signaling (e.g., a posSIB). In some aspects, an event may be a measured validity condition. For example, the positioning target wireless device 502 may measure delay spread and find that the delay spread changed with a value A. The positioning target wireless device 502 may then transmit its positioning capability to the positioning network entity 506 that corresponds with the new delay spread setting. In some aspects, an event may be a periodic timing. For example, the positioning target wireless device 502 may be configured to periodically transmit its positioning capability to the positioning network entity 506 (e.g., every minute, or every 10 minutes).

The positioning target wireless device 502 may transmit its positioning capability to the positioning network entity 506 as the capability communication 516 to the positioning network entity 506. The capability communication 516 may include one or more sets of validity conditions so that the positioning network entity 506 may better configure resources to match a positioning model of the positioning target wireless device 502. The positioning network entity 506 may receive the capability communication 516 including the positioning capability of the positioning target wireless device 502. For example, the positioning target wireless device 502 may indicate validity conditions of supported positioning models that are within X distance of an estimated location or a given center point of the positioning target wireless device 502. In some aspects, the X threshold distance may be predefined, such as by a standard that applies to the positioning target wireless device 502, or a pre-configuration of the positioning target wireless device 502. In some aspects, the X threshold distance may be provided as one of the set of event conditions 508. In some aspects, the center point of the positioning target wireless device 502 may be provided as one of the set of event conditions 508. In some aspects, the positioning target wireless device 502 may transmit its positioning capability to the positioning network entity 506 as part of an LPPa protocol. In some aspects, the positioning target wireless device 502 may transmit its positioning capability to the positioning network entity 506 as part of an NRPPa protocol for assistance information broadcast procedure.

The positioning network entity 506 may transmit a set of event conditions 510 to at least some of the positioning neighbor wireless devices 504. At least some of the positioning neighbor wireless devices 504 may receive the set of event conditions 510 from the positioning network entity 506. The positioning network entity 506 may transmit the set of event conditions 510 as a new radio (NR) positioning protocol (NRPP) annex (NRPPa) message. The set of event conditions 510 may be transmitted as part of broadcast signaling (e.g., a posSIB) or as part of assistance data signaling. The positioning network entity 506 may request at least some of the positioning neighbor wireless devices 504 to indicate its support for a positioning approach with a given validity condition as part of NRPPa TRP information transfer or TRP information exchange. The set of event conditions 510 may include an indication of an event that may trigger at least some of the positioning neighbor wireless devices 504 to transmit their positioning capability to the positioning network entity 506. For example, one of the positioning neighbor wireless devices 504 may transmit IEs of supported validity conditions and their description to the positioning network entity 506.

In other aspects, at least some of the positioning neighbor wireless devices 504 may be preconfigured to transmit their positioning capability to the positioning network entity 506 based on a set of event conditions. For example, a standard may be defined for at least some of the positioning neighbor wireless devices 504. A standard may indicate that one of the positioning neighbor wireless devices 504 transmit its positioning capability to the positioning network entity 506 based on a set of preconfigured event conditions.

At 514, at least some of the positioning neighbor wireless devices 504 may detect an event that triggers one of the positioning neighbor wireless devices 504 to transmit its positioning capability to the positioning network entity 506. In some aspects, an event may be a timer expiration. For example, one of the positioning neighbor wireless devices 504 may have a countdown timer. When the countdown timer expires, the positioning neighbor wireless device may transmit its positioning capability to the positioning network entity 506. The timer setting may be signaled by the positioning network entity 506 as part of broadcast signaling (e.g., a posSIB). In some aspects, an event may be a measured validity condition. For example, one of the positioning neighbor wireless devices 504 may measure delay spread and find that the delay spread changed with a value A. The positioning neighbor wireless device may then transmit its positioning capability to the positioning network entity 506 that corresponds with the new delay spread setting. In some aspects, an event may be a periodic timing. For example, one of the positioning neighbor wireless devices 504 may be configured to periodically transmit its positioning capability to the positioning network entity 506.

At least some of the positioning neighbor wireless devices 504 may transmit their positioning capability to the positioning network entity 506 as the capability communication 518 to the positioning network entity 506. The capability communication 518 may include one or more sets of validity conditions so that the positioning network entity 506 may better configure resources to match corresponding positioning models of at least some of the positioning neighbor wireless devices 504. The positioning network entity 506 may receive the capability communication 518 including the positioning capability of at least some of the positioning neighbor wireless devices 504.

In some aspects, the positioning network entity 506 and the positioning target wireless device 502 may be configured to communicate with one another via the capability communication 516 to convey support of the positioning target wireless device 502 of a positioning model for one or more given validity conditions. For example, the positioning network entity 506 may transmit a general request to the positioning target wireless device 502 to provide model validity conditions that it can support. The positioning target wireless device 502 may receive the general request from the positioning network entity 506. The positioning target wireless device 502 may respond to the general request with a capability response message that includes an IE with a bitmap indication of a support of the requested conditions. The positioning network entity 506 may receive the capability response message. The positioning network entity 506 may transmit another detailed request (e.g., a follow-up request) asking the positioning target wireless device 502 to indicate if it supports a model with specific validity conditions. The request message may include explicit detailing of the solicited conditions. The positioning target wireless device 502 may respond with another capability response message that includes IEs listing supported validity conditions and their description. The positioning network entity 506 may receive the follow-up capability response message. In another example, the positioning network entity 506 may transmit a single detailed request asking the positioning target wireless device 502 to indicate if it supports a set of positioning models corresponding with a set of validity conditions. The request may include explicit detailing of a set of validity conditions, or a plurality of sets of validity conditions. The positioning target wireless device 502 may receive the single detailed request, and may respond with a single detailed capability message that includes IEs that list supported validity conditions and their description. In some aspects, the positioning models that are valid for the positioning target wireless device 502 may account for network selection. In other words, a positioning model may be valid if the positioning target wireless device 502 is connected to a designated network (e.g., a private network in a certain location). The positioning target wireless device 502 may be configured to indicate a set of positioning models if it is connected to a specified network associated with the set of positioning models. For example, the positioning target wireless device 502 may connect to a network designated as A. The positioning target wireless device 502 may check with a backend over-the-top (OTT) server whether certain positioning models are available and valid for the network A. The positioning target wireless device 502 may download information associated with the positioning models associated with network A, and may transmit at least some of that information to the positioning network entity 506 as the capability communication 516. The capability communication 516 may be part of an LPPa protocol, for example between a UE and an LMF.

Similarly, the positioning network entity 506 and at least some of the positioning neighbor wireless devices 504 may be configured to communicate with one another via the capability communication 518 to convey support of at least some of the positioning neighbor wireless devices 504 of a positioning model for one or more given validity conditions. For example, the positioning network entity 506 may transmit a general request to one of the positioning neighbor wireless devices 504 to provide model validity conditions that it can support. The positioning neighbor wireless device may receive the general request from the positioning network entity 506. The positioning neighbor wireless device may respond to the general request with a capability response message that includes an IE with a bitmap indication of a support of the requested conditions. The positioning network entity 506 may receive the capability response message. The positioning network entity 506 may transmit another detailed request (e.g., a follow-up request) asking the positioning neighbor wireless device to indicate if it supports a model with specific validity conditions. The request message may include explicit detailing of the solicited conditions. The positioning neighbor wireless device may respond with another capability response message that includes IEs listing supported validity conditions and their description. The positioning network entity 506 may receive the follow-up capability response message. In another example, the positioning network entity 506 may transmit a single detailed request asking one of the positioning neighbor wireless devices 504 to indicate if it supports a set of positioning models corresponding with a set of validity conditions. The request may include explicit detailing of a set of validity conditions, or a plurality of sets of validity conditions. The positioning neighbor wireless device may receive the single detailed request, and may respond with a single detailed capability message that includes IEs that list supported validity conditions and their description. In another example, the positioning network entity 506 may request one of the positioning neighbor wireless devices 504 to indicate if it supports a positioning model with specific validity conditions. The request message may include explicit detailing of the solicited conditions. The positioning neighbor wireless device may respond with a message that includes IEs listing supported validity conditions and their description. The capability communication 518 may be part of an NRPPa protocol, for example between an NG-RAN node and an LMF. The capability communication 518 may be a part of NRPPa TRP information transfer.

The positioning target wireless device 502 and/or at least some of the set of positioning neighbor wireless devices 504 may be configured to select a positioning model based on a set of validity conditions that may represent an environment in which the positioning model is trained and known to work on. The set of validity conditions may include an applicable area, zone, scenario, timing, hardware impairments, or resource settings.

The positioning target wireless device 502 and/or at least some of the positioning neighbor wireless devices 504 may obtain a set of conditions in a plurality of ways. In some aspects, the positioning target wireless device 502 and/or at least some of the positioning neighbor wireless devices 504 may use one or more sensors to detect a condition, for example a GNSS sensor that performs a GNSS fix or a clock that detects a time of day. In some aspects, the positioning network entity 506 may transmit a set of conditions 520 to the positioning target wireless device 502. In some aspects, the positioning network entity 506 may transmit a set of conditions 522 to at least some of the positioning neighbor wireless devices 504. In some aspects, the positioning target wireless device 502 and at least some of the positioning neighbor wireless devices 504 may communicate a set of conditions 524 to one another, such as a zone of a network node or a resource bandwidth capability. The set of conditions may configure resources and positioning for the positioning target wireless device 502 and/or at least some of the positioning neighbor wireless devices 504, respectively, to match supported validity conditions for the corresponding wireless device.

At 526, the positioning target wireless device 502 may select a positioning model based on the conditions associated with the positioning target wireless device 502 that satisfy a set of validity conditions associated with a positioning model. At 528, at least some of the positioning neighbor wireless devices 504 may select a positioning model based on the conditions associated with at least some of the positioning neighbor wireless devices 504 that satisfy a set of validity conditions associated with a positioning model.

The set of validity conditions may include, for example, applicable area/zone, scenario/deployment, timing, hardware impairments, resource settings, radio propagation characteristics, mobile network operators, and/or network vendor equipment associated with the environment in which the positioning model was trained or is known to work on.

The set of validity conditions may include a set of location attributes, a set of deployment attributes, a set of time periods, a set of hardware limitations, a set of resource attributes, a set of RF signal propagation characteristics, and/or a set of network identifiers.

The set of location attributes may be represented by a range of latitudes (e.g., a latitude range between 32.71° N and 32.72° N), a range of longitudes (e.g., a longitude range between 117.16° W and 117.17° W), and/or a range of elevations (e.g., an elevation range between 40 feet and 80 feet above sea level).

The set of deployment attributes may include a location bitmap, an antenna elevation range, an antenna setting, a reflector density range, a reflector size range, a relative elevation range, a blocker density range, a blocker size range, and/or a blocker relative elevation range. A location bitmap may include a bitmap of being outdoors (e.g., urban macro, urban micro, rural), indoor (e.g., office, factory, residential, shopping mall), or a mixed indoor/outdoor location. A mixed indoor/outdoor location may represent a positioning model trained to work on both indoor and outdoor deployments. A mixed indoor/outdoor location may represent a positioning model capable to handle wireless environments in both indoor and outdoor deployments. A simple location bitmap may be, for example 00 representing an indoor location, 01 representing an outdoor location, and 11 representing a mixed indoor/outdoor location. A more complex location bitmap may be, for example, 000 representing an indoor home/residential location, 001 representing and indoor office location, 010 representing an indoor commercial location/(e.g., a shopping mall or a large grocery store), 100 representing an outdoor dense urban location (e.g., downtown), 101 representing an outdoor urban location (e.g., a residential neighborhood, a commercial plaza), 110 representing an outdoor suburban location (e.g., a small town), and 111 representing an outdoor rural location. An antenna setting may include an indication of a base station antenna that is mounted on a rooftop, pole mounted, or ceiling mounted. There may be a plurality of factors that affect the antenna setting, for example the expected coverage of the antenna and the operating frequency of the antenna. The selection of the antenna location may be constrained by the space availability. For example, in a dense urban setting of a downtown area with high rise buildings, it may be more efficient to mount antennas on light poles to ensure coverage on streets, particularly when operating with mmWave (mmW) frequencies. In some aspects, the antenna setting for a given site may be provided to the wireless device via the positioning network entity 506. For example, the antenna setting for a site associated with the positioning target wireless device 502 may be provided by the set of conditions 520 from the positioning network entity 506, or the antenna settings for a site associated with one of the positioning neighbor wireless devices 504 may be provided by the set of conditions 522 from the positioning network entity 506. The set of deployment attributes may include clutter settings for which the positioning model is deemed compatible, (e.g., a range of density, size, and elevation of reflectors and blockers). The ranges of reflectors for a given unit area may be expressed as a range of reflectors (e.g., 5-10 reflectors) within a given unit area (e.g., per 100 square meters). Another way of indicating the density of reflectors or blockers is to indicate the probability of a LOS interference existing (e.g., a probability between 75% and 100%, or a probability between 25% and 49%).

The set of time periods may include an indicator of an expiration time, an indicator of a range of time, and/or an indicator of a periodic range of time. In some aspects, the set of time periods may indicate how long the positioning model may be used before being considered outdated (e.g., days, weeks, months). When the positioning model is considered outdated, the positioning model may be configured to be retrained or finetuned. The positioning model may become outdated because of time varying changes happening in a wireless channel due to mobility of surrounding objects, or mobility of the positioning target wireless device 502. In some aspects, the set of time periods may include a range of time for which the positioning model may be used (e.g., morning, afternoon, evening, weekday, weekend). As mobility and clutter density may vary across the day, different timings may also indicate different traffic conditions. In some aspects, available BWP for positioning may vary depending upon a timing attribute.

The set of hardware limitations may include a range of clock drift, a distribution of clock drift, a range of TX-RX timing errors, a distribution of TX-RX timing errors, a range of network synchronization errors, and/or a distribution of network synchronization errors. The positioning model may not be considered accurate outside of the hardware limitation indicators. A distribution may be represented by a percentage likelihood, for example over 50% of the clock drift is within a range X and over 90% of the clock drift is within a range Y. In some aspects, a chip/device vendor of a wireless device may characterize the hardware limitations in a lab setup. In some aspects, a vendor may consider the wireless device to be at a fixed location, and may monitor the timing of the LOS peak (or other peaks) while at the fixed location. The change in the LOS peak may be affected by clock drift of the wireless device. This procedure may be repeated for a large number of iterations to construct an accurate distribution associated with the wireless device at the fixed location.

The set of resource attributes may include a number of resources (e.g., number of PRS, number of PRS sets), a resource bandwidth (e.g., 20 MHz, 40 MHz, 50 MHz, 100 MHz, 400 MHz), and/or a resource configuration (e.g., configuration ID, combinations of RS configuration). In some aspects, the positioning network entity 506 may configure resources for positioning, and may indicate the setting to the positioning target wireless device 502 as the set of conditions 520, or may indicate the setting to at least some of the positioning neighbor wireless devices 504 as the set of conditions 522. In some aspects, a wireless device may have multiple positioning models that can support different resource configurations (e.g., different BWPs, different number of beams to/from other wireless devices,). The wireless device may indicate the supported resource configurations in a capability communication (e.g., the capability communication 516 or the capability communication 518), and the positioning network entity 506 may configure the resources accordingly.

The set of RF signal propagation characteristics may include a range of channel delay spread, a distribution of channel delay spread, a range of Doppler spread, a distribution of Doppler spread, a range of angular spread, a distribution of angular spread, a LOS peak width, and/or a number of LOS peaks in a multipath profile. In some aspects, a positioning model may be trained for a given set of radio characteristics (e.g., channels with given Doppler characteristics or delay spread). The positioning network entity 506 may measure these RF signal propagations for a given deployment site (e.g., commercial plaza) and then select an appropriate positioning model that is trained with equivalent characteristics. For the Doppler spread, a positioning model may be measured on a network wireless device (e.g., a base station) or a target wireless device (e.g., a UE). For example, if the positioning target wireless device 502 is on a high-speed train, a network may estimate the speed of the positioning target wireless device 502 and estimate its Doppler based on reported measurements and mobility patterns. In some aspects, the network may estimate the drift in a RS center frequency and use this drift as a metric to characterize the Doppler effect.

The set of network identifiers may include a set of cell identifiers (IDs), a set of mobile network operators, and/or a set of network vendors. The mobile network operators may be associated with network operators for whom the positioning model has been validated and tested. The network vendors may be associated with network vendors for whom the positioning model has been validated and tested. In some aspects, the positioning target wireless device 502 may indicate this validity information to a set of specified networks, for example a set of specified networks that have permission to access such information. The positioning target wireless device 502 may identify such networks by a set of TRP IDs, a set of cell IDs, a network operator identifier, and/or a network vendor identifier.

The positioning target wireless device 502 may receive a set of positioning signals 530 from the set of positioning neighbor wireless devices 504. The set of positioning signals 530 may include, for example, PRS, SRS, SSB, or CSI-RS, etc. At 532, the positioning target wireless device 502 may measure the set of positioning signals 530. At 536, the positioning target wireless device 502 may apply the selected positioning model to the measured results to calculate a set of positioning results based on the measured set of positioning signals. The positioning target wireless device 502 may transmit the set of positioning results 540 to the positioning network entity 506.

At least some of the positioning neighbor wireless devices 504 may receive a set of positioning signals 530 from the positioning target wireless device 502. The set of positioning signals 530 may include, for example, SRS. At 534, at least some of the positioning neighbor wireless devices 504 may measure the set of positioning signals 530. At 538, at least some of the positioning neighbor wireless devices 504 may apply selected positioning models to the measured results to calculate positioning results based on the measured set of positioning signals. At least some of the positioning neighbor wireless devices 504 may transmit the set of positioning results 542 to the positioning network entity 506.

FIG. 6 is a flowchart 600 of a method of wireless communication. The method may be performed by a wireless device (e.g., the UE 104, the UE 350; the base station 102, the base station 310; the wireless device 402, the wireless device 404, the wireless device 406; the positioning target wireless device 502; the set of positioning neighbor wireless devices 504; the apparatus 1004; the network entity 1002, the network entity 1102, the network entity 1260). At 602, the wireless device may select a positioning model from a set of positioning models supported by the wireless device based on a set of conditions of the wireless device satisfying a set of validity conditions associated with the selected positioning model. For example, 602 may be performed by the positioning target wireless device 502 in FIG. 5, which may, at 526, select a positioning model from a set of positioning models supported by the positioning target wireless device 502 based on a set of conditions of the positioning target wireless device 502 satisfying a set of validity conditions associated with the selected positioning model. Moreover, 602 may be performed by the component 198 in FIG. 1, 3, 10, 11, or 12).

At 604, the wireless device may receive a set of positioning signals. For example, 604 may be performed by the positioning target wireless device 502 in FIG. 5, which may receive the set of positioning signals 530 from the set of positioning neighbor wireless devices 504. Moreover, 604 may be performed by the component 198 in FIG. 1, 3, 10, 11, or 12).

At 606, the wireless device may measure the set of positioning signals. For example, 606 may be performed by the positioning target wireless device 502 in FIG. 5, which may, at 532, measure the set of positioning signals 530. Moreover, 606 may be performed by the component 198 in FIG. 1, 3, 10, 11, or 12).

At 608, the wireless device may calculate, using the selected positioning model, a set of estimated positioning results based on the measured set of positioning signals. For example, 608 may be performed by the positioning target wireless device 502 in FIG. 5, which may, at 536, calculate, using the selected positioning model, a set of estimated positioning results based on the measured set of positioning signals. Moreover, 608 may be performed by the component 198 in FIG. 1, 3, 10, 11, or 12).

FIG. 7 is a flowchart 700 of a method of wireless communication. The method may be performed by a wireless device (e.g., the UE 104, the UE 350; the base station 102, the base station 310; the wireless device 402, the wireless device 404, the wireless device 406; the positioning target wireless device 502; the set of positioning neighbor wireless devices 504; the apparatus 1004; the network entity 1002, the network entity 1102, the network entity 1260). At 702, the wireless device may select a positioning model from a set of positioning models supported by the wireless device based on a set of conditions of the wireless device satisfying a set of validity conditions associated with the selected positioning model. For example, 702 may be performed by the positioning target wireless device 502 in FIG. 5, which may, at 526, select a positioning model from a set of positioning models supported by the positioning target wireless device 502 based on a set of conditions of the positioning target wireless device 502 satisfying a set of validity conditions associated with the selected positioning model. Moreover, 702 may be performed by the component 198 in FIG. 1, 3, 10, 11, or 12).

At 604, the wireless device may receive a set of positioning signals. For example, 704 may be performed by the positioning target wireless device 502 in FIG. 5, which may receive the set of positioning signals 530 from the set of positioning neighbor wireless devices 504. Moreover, 704 may be performed by the component 198 in FIG. 1, 3, 10, 11, or 12).

At 706, the wireless device may measure the set of positioning signals. For example, 706 may be performed by the positioning target wireless device 502 in FIG. 5, which may, at 532, measure the set of positioning signals 530. Moreover, 706 may be performed by the component 198 in FIG. 1, 3, 10, 11, or 12).

At 708, the wireless device may calculate, using the selected positioning model, a set of estimated positioning results based on the measured set of positioning signals. For example, 708 may be performed by the positioning target wireless device 502 in FIG. 5, which may, at 536, calculate, using the selected positioning model, a set of estimated positioning results based on the measured set of positioning signals. Moreover, 708 may be performed by the component 198 in FIG. 1, 3, 10, 11, or 12).

At 710, the wireless device may receive a request for a capability of the wireless device to select the positioning model from the set of positioning models based on a set of validity condition types. For example, 710 may be performed by the positioning target wireless device 502 in FIG. 5, which may receive a set of event conditions 508 from the positioning network entity 506. The set of event conditions 508 may include a request for a capability of the positioning target wireless device 502 to select a positioning model from a set of positioning models based on a set of validity condition types. Moreover, 710 may be performed by the component 198 in FIG. 1, 3, 10, 11, or 12).

At 712, the wireless device may receive at least one of an LPPa message including the request or an NRPPa message including the request. For example, 712 may be performed by the positioning target wireless device 502 in FIG. 5, which may receive a set of event conditions 508 from the positioning network entity 506. The set of event conditions 508 may include an LPPa message including the request. In another example, 712 may be performed by one of the set of positioning neighbor wireless devices 504 in FIG. 5, which may receive a set of event conditions 510 from the positioning network entity 506. The set of event conditions 510 may include an NRPPa message including the request. Moreover, 712 may be performed by the component 198 in FIG. 1, 3, 10, 11, or 12).

At 714, the wireless device may transmit an indication of whether the wireless device is configured to select the positioning model from the set of positioning models based on at least one of the set of validity condition types in response to receiving the request. For example, 714 may be performed by the positioning target wireless device 502 in FIG. 5, which may transmit the capability communication 516 to the positioning network entity 506. The capability communication 516 may include an indication of whether the positioning target wireless device 502 is configured to select a positioning model from a set of positioning models based on at least one of a set of validity condition types in response to receiving the request. Moreover, 714 may be performed by the component 198 in FIG. 1, 3, 10, 11, or 12).

At 716, the wireless device may receive a second request for a plurality of sets of validity conditions that are associated with the set of positioning models and at least one of the set of validity condition types. For example, 716 may be performed by the positioning target wireless device 502 in FIG. 5, which may receive the capability communication 516 from the positioning network entity 506. The capability communication 516 may include a second request for a plurality of sets of validity conditions that are associated with the set of positioning models supported by the positioning target wireless device 502 and at least one of the set of validity condition types. Moreover, 716 may be performed by the component 198 in FIG. 1, 3, 10, 11, or 12).

At 718, the wireless device may transmit the plurality of sets of validity conditions in response to receiving the second request, where the plurality of sets of validity conditions may include the set of validity conditions. For example, 718 may be performed by the positioning target wireless device 502 in FIG. 5, which may transmit the capability communication 516 to the positioning network entity 506. The capability communication 516 may include a plurality of sets of validity conditions associated with the set of positioning models supported by the positioning target wireless device 502 in response to receiving the second request. The plurality of sets of validity conditions may include the set of validity conditions used by the positioning network entity 506 to assist the positioning target wireless device 502 in selecting a positioning model. Moreover, 718 may be performed by the component 198 in FIG. 1, 3, 10, 11, or 12).

At 720, the wireless device may receive the set of validity conditions from a network node. For example, 720 may be performed by the positioning target wireless device 502 in FIG. 5, which may receive the set of conditions 520 from the positioning network entity 506. In another example, 720 may be performed by the positioning target wireless device 502 in FIG. 5, which may receive the set of conditions 524 from at least one of the positioning neighbor wireless devices 504. Moreover, 720 may be performed by the component 198 in FIG. 1, 3, 10, 11, or 12).

Figure 8:
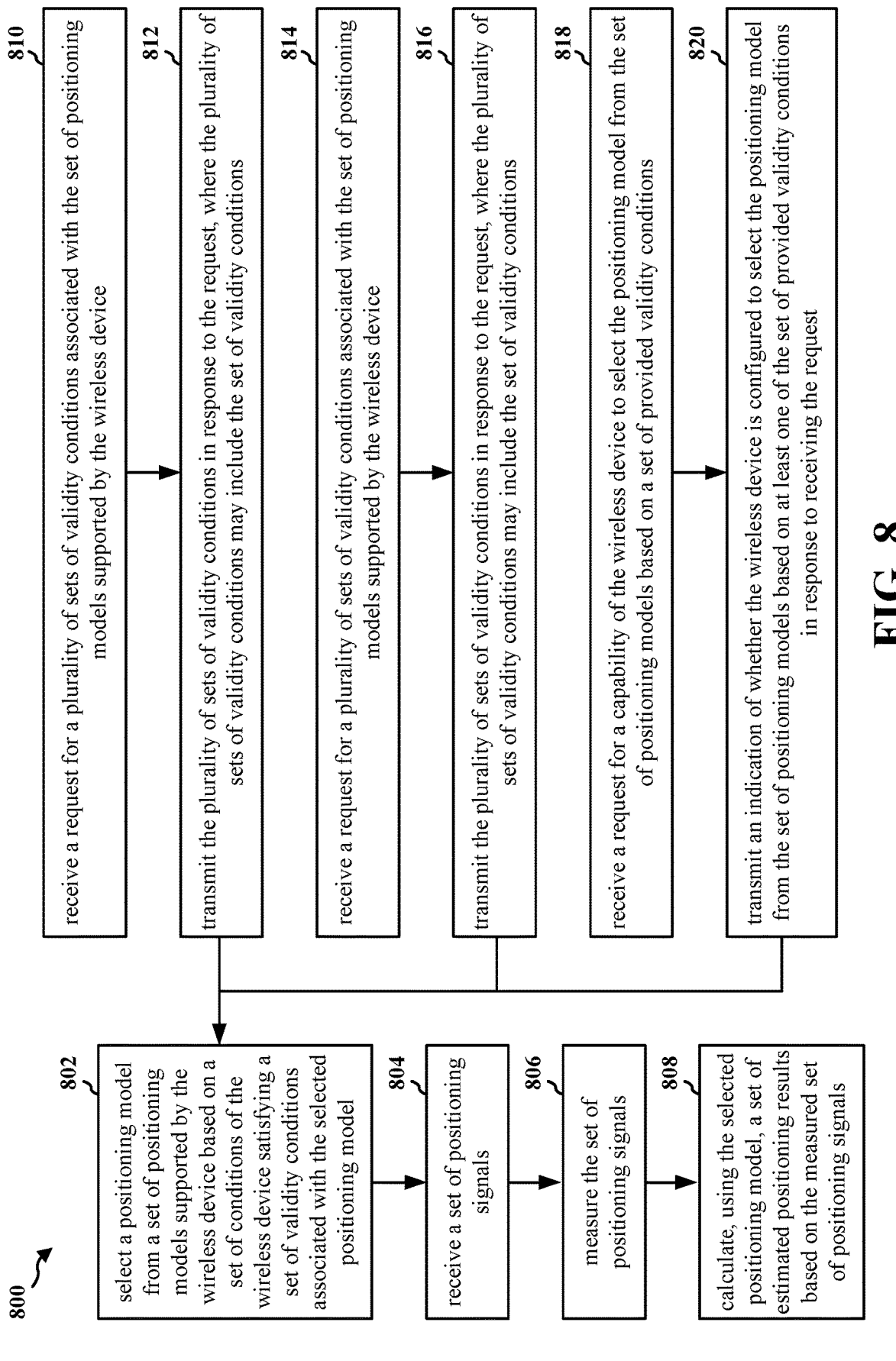
FIG. 8 is a flowchart of a method of wireless communication.

FIG. 8 is a flowchart 800 of a method of wireless communication. The method may be performed by a wireless device (e.g., the UE 104, the UE 350; the base station 102, the base station 310; the wireless device 402, the wireless device 404, the wireless device 406; the positioning target wireless device 502; the set of positioning neighbor wireless devices 504; the apparatus 1004; the network entity 1002, the network entity 1102, the network entity 1260). At 802, the wireless device may select a positioning model from a set of positioning models supported by the wireless device based on a set of conditions of the wireless device satisfying a set of validity conditions associated with the selected positioning model. For example, 802 may be performed by the positioning target wireless device 502 in FIG. 5, which may, at 526, select a positioning model from a set of positioning models supported by the positioning target wireless device 502 based on a set of conditions of the positioning target wireless device 502 satisfying a set of validity conditions associated with the selected positioning model. Moreover, 802 may be performed by the component 198 in FIG. 1, 3, 10, 11, or 12).

At 804, the wireless device may receive a set of positioning signals. For example, 804 may be performed by the positioning target wireless device 502 in FIG. 5, which may receive the set of positioning signals 530 from the set of positioning neighbor wireless devices 504. Moreover, 804 may be performed by the component 198 in FIG. 1, 3, 10, 11, or 12).

At 806, the wireless device may measure the set of positioning signals. For example, 806 may be performed by the positioning target wireless device 502 in FIG. 5, which may, at 532, measure the set of positioning signals 530. Moreover, 806 may be performed by the component 198 in FIG. 1, 3, 10, 11, or 12).

At 808, the wireless device may calculate, using the selected positioning model, a set of estimated positioning results based on the measured set of positioning signals. For example, 808 may be performed by the positioning target wireless device 502 in FIG. 5, which may, at 536, calculate, using the selected positioning model, a set of estimated positioning results based on the measured set of positioning signals. Moreover, 808 may be performed by the component 198 in FIG. 1, 3, 10, 11, or 12).

At 810, the wireless device may receive a request for a plurality of sets of validity conditions associated with the set of positioning models supported by the wireless device. For example, 810 may be performed by the positioning target wireless device 502 in FIG. 5, which may receive the capability communication 516 from the positioning network entity 506. The capability communication 516 may include a request for a plurality of sets of validity conditions associated with the set of positioning models supported by the positioning target wireless device 502. Moreover, 810 may be performed by the component 198 in FIG. 1, 3, 10, 11, or 12).

At 812, the wireless device may transmit the plurality of sets of validity conditions in response to the request, where the plurality of sets of validity conditions may include the set of validity conditions. For example, 812 may be performed by the positioning target wireless device 502 in FIG. 5, which may transmit the capability communication 516 to the positioning network entity 506. The capability communication 516 may include the plurality of sets of validity conditions in response to the request. The plurality of sets of validity conditions may include the set of validity conditions that the positioning network entity 506 uses to assist the positioning target wireless device 502 in selecting a positioning model. Moreover, 812 may be performed by the component 198 in FIG. 1, 3, 10, 11, or 12).

At 814, the wireless device may receive a request for a plurality of sets of validity conditions associated with the set of positioning models supported by the wireless device. For example, 814 may be performed by the positioning target wireless device 502 in FIG. 5, which may receive the capability communication 516 from the positioning network entity 506. The capability communication 516 may include a request for a plurality of sets of validity conditions associated with the set of positioning models supported by the positioning target wireless device 502. Moreover, 814 may be performed by the component 198 in FIG. 1, 3, 10, 11, or 12).

At 816, the wireless device may transmit the plurality of sets of validity conditions in response to the request, where the plurality of sets of validity conditions may include the set of validity conditions. For example, 816 may be performed by the positioning target wireless device 502 in FIG. 5, which may transmit the capability communication 516 to the positioning network entity 506. The capability communication 516 may include the plurality of sets of validity conditions in response to the request. The plurality of sets of validity conditions may include the set of validity conditions that the positioning network entity 506 uses to assist the positioning target wireless device 502 in selecting a positioning model. Moreover, 816 may be performed by the component 198 in FIG. 1, 3, 10, 11, or 12).

At 818, the wireless device may receive a request for a capability of the wireless device to select the positioning model from the set of positioning models based on a set of provided validity conditions. For example, 818 may be performed by the positioning target wireless device 502 in FIG. 5, which may receive the capability communication 516 from the positioning network entity 506. The capability communication 516 may include a request for a capability of the positioning target wireless device 502 to select a positioning model from a set of positioning models based on a set of provided validity conditions. Moreover, 818 may be performed by the component 198 in FIG. 1, 3, 10, 11, or 12).

At 820, the wireless device may transmit an indication of whether the wireless device is configured to select the positioning model from the set of positioning models based on at least one of the set of provided validity conditions in response to receiving the request. For example, 820 may be performed by the positioning target wireless device 502 in FIG. 5, which may transmit the capability communication 516 to the positioning network entity 506. The capability communication 516 may include an indication of whether the positioning target wireless device 502 is configured to select a positioning model from a set of positioning models based on at least one of the set of provided validity conditions in response to receiving the request. Moreover, 820 may be performed by the component 198 in FIG. 1, 3, 10, 11, or 12).

Figure 9:
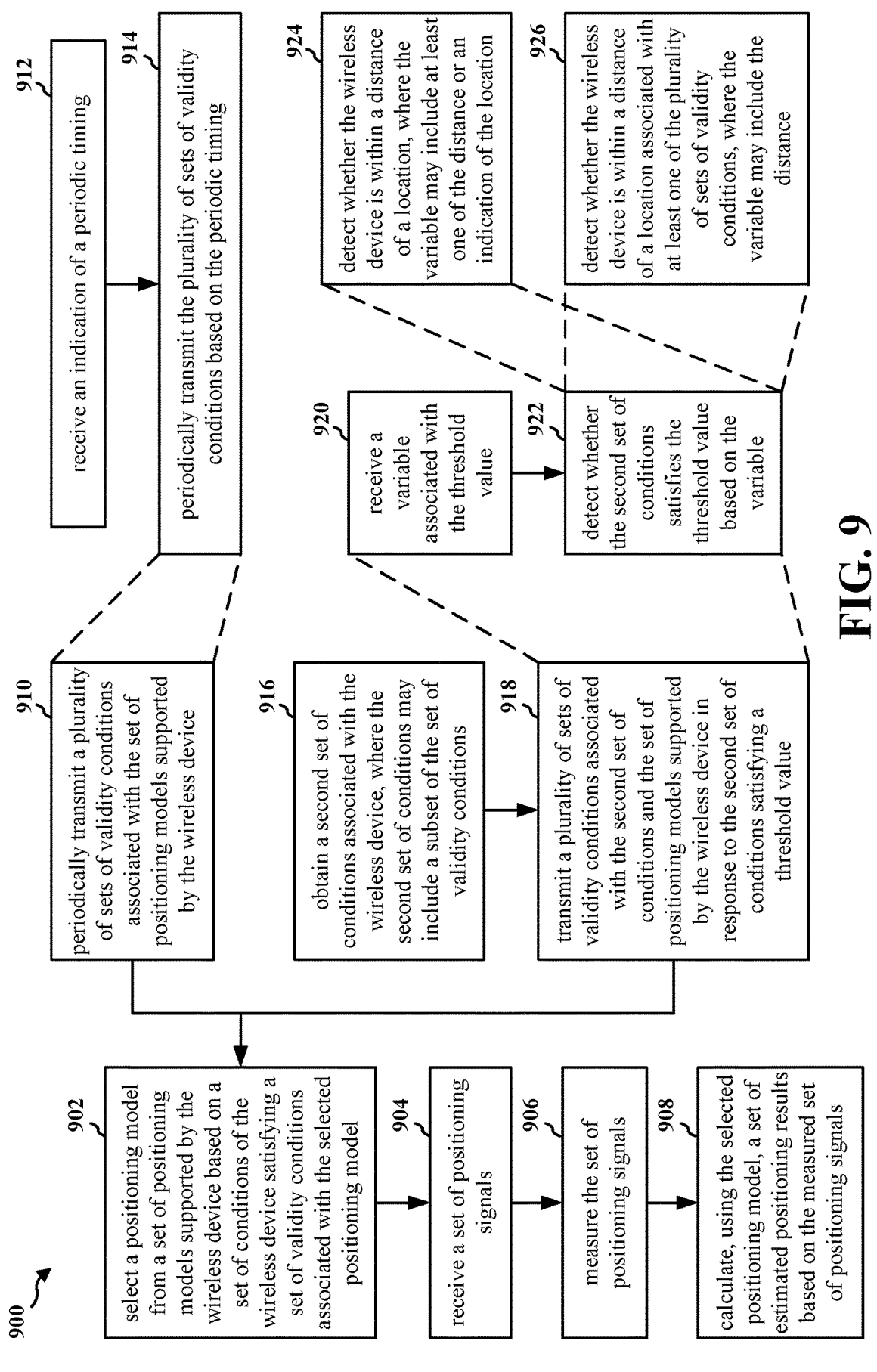
FIG. 9 is a flowchart of a method of wireless communication.

FIG. 9 is a flowchart 900 of a method of wireless communication. The method may be performed by a wireless device (e.g., the UE 104, the UE 350; the base station 102, the base station 310; the wireless device 402, the wireless device 404, the wireless device 406; the positioning target wireless device 502; the set of positioning neighbor wireless devices 504; the apparatus 1004; the network entity 1002, the network entity 1102, the network entity 1260). At 902, the wireless device may select a positioning model from a set of positioning models supported by the wireless device based on a set of conditions of the wireless device satisfying a set of validity conditions associated with the selected positioning model. For example, 902 may be performed by the positioning target wireless device 502 in FIG. 5, which may, at 526, select a positioning model from a set of positioning models supported by the positioning target wireless device 502 based on a set of conditions of the positioning target wireless device 502 satisfying a set of validity conditions associated with the selected positioning model. Moreover, 902 may be performed by the component 198 in FIG. 1, 3, 10, 11, or 12).

At 904, the wireless device may receive a set of positioning signals. For example, 904 may be performed by the positioning target wireless device 502 in FIG. 5, which may receive the set of positioning signals 530 from the set of positioning neighbor wireless devices 504. Moreover, 904 may be performed by the component 198 in FIG. 1, 3, 10, 11, or 12).

At 906, the wireless device may measure the set of positioning signals. For example, 906 may be performed by the positioning target wireless device 502 in FIG. 5, which may, at 532, measure the set of positioning signals 530. Moreover, 906 may be performed by the component 198 in FIG. 1, 3, 10, 11, or 12).

At 908, the wireless device may calculate, using the selected positioning model, a set of estimated positioning results based on the measured set of positioning signals. For example, 908 may be performed by the positioning target wireless device 502 in FIG. 5, which may, at 536, calculate, using the selected positioning model, a set of estimated positioning results based on the measured set of positioning signals. Moreover, 908 may be performed by the component 198 in FIG. 1, 3, 10, 11, or 12).

At 910, the wireless device may periodically transmit a plurality of sets of validity conditions associated with the set of positioning models supported by the wireless device. For example, 910 may be performed by the positioning target wireless device 502 in FIG. 5, which may periodically transmit a plurality of sets of validity conditions associated with the set of positioning models supported by the wireless device as the capability communication 516. The positioning target wireless device 502 may transmit these sets of validity conditions in accordance with a standard, or the set of event conditions 508, which may indicate the periodicity. In response, the positioning network entity 506 may update the set of conditions 520 transmitted to the positioning target wireless device 502 to assist in the positioning target wireless device 502 selecting a positioning model based on the updated validity conditions. Moreover, 910 may be performed by the component 198 in FIG. 1, 3, 10, 11, or 12).

At 912, the wireless device may receive an indication of a periodic timing. For example, 912 may be performed by the positioning target wireless device 502 in FIG. 5, which may receive an indication of a periodic timing in the set of event conditions 508 from the positioning network entity 506. Moreover, 912 may be performed by the component 198 in FIG. 1, 3, 10, 11, or 12).

At 914, the wireless device may periodically transmit the plurality of sets of validity conditions based on the periodic timing. For example, 914 may be performed by the positioning target wireless device 502 in FIG. 5, which may periodically transmit the plurality of sets of validity conditions as the capability communication 516 based on the periodic timing. Moreover, 914 may be performed by the component 198 in FIG. 1, 3, 10, 11, or 12).

At 916, the wireless device may obtain a second set of conditions associated with the wireless device, where the second set of conditions may include a subset of the set of validity conditions. For example, 916 may be performed by the positioning target wireless device 502 in FIG. 5, which may obtain a second set of conditions as the set of conditions 520 from the positioning network entity 506 associated with the positioning target wireless device 502. The second set of conditions may include a subset of the set of validity conditions transmitted as the capability communication 516. Moreover, 916 may be performed by the component 198 in FIG. 1, 3, 10, 11, or 12).

At 918, the wireless device may transmit a plurality of sets of validity conditions associated with the second set of conditions and the set of positioning models supported by the wireless device in response to the second set of conditions satisfying a threshold value. For example, 918 may be performed by the positioning target wireless device 502 in FIG. 5, which may transmit a plurality of sets of validity conditions associated with the second set of conditions and the set of positioning models supported by the positioning target wireless device 502 as the capability communication 516 in response to the second set of conditions satisfying a threshold value. Moreover, 918 may be performed by the component 198 in FIG. 1, 3, 10, 11, or 12).

At 920, the wireless device may receive a variable associated with the threshold value. For example, 920 may be performed by the positioning target wireless device 502 in FIG. 5, which may receive a variable associated with the threshold value as the set of event conditions 508 or as the capability communication 516. Moreover, 920 may be performed by the component 198 in FIG. 1, 3, 10, 11, or 12).

At 922, the wireless device may detect whether the second set of conditions satisfies the threshold value based on the variable. For example, 922 may be performed by the positioning target wireless device 502 in FIG. 5, which may, at 512, detect whether the second set of conditions satisfies the threshold value based on the variable. Moreover, 922 may be performed by the component 198 in FIG. 1, 3, 10, 11, or 12).

At 924, the wireless device may detect whether the wireless device is within a distance of a location, where the variable may include at least one of the distance or an indication of the location. For example, 924 may be performed by the positioning target wireless device 502 in FIG. 5, which may, at 512, detect whether the positioning target wireless device 502 is within a distance of a location. The variable from the set of event conditions 508 may include at least one of the distance or an indication of the location. Moreover, 924 may be performed by the component 198 in FIG. 1, 3, 10, 11, or 12).

At 926, the wireless device may detect whether the wireless device is within a distance of a location associated with at least one of the plurality of sets of validity conditions, where the variable may include the distance. For example, 926 may be performed by the positioning target wireless device 502 in FIG. 5, which may, at 512, detect whether the positioning target wireless device 502 is within a distance of a location associated with at least one of the plurality of sets of validity conditions of the set of event conditions 508. The variable may include the distance. Moreover, 926 may be performed by the component 198 in FIG. 1, 3, 10, 11, or 12).

Figure 10:
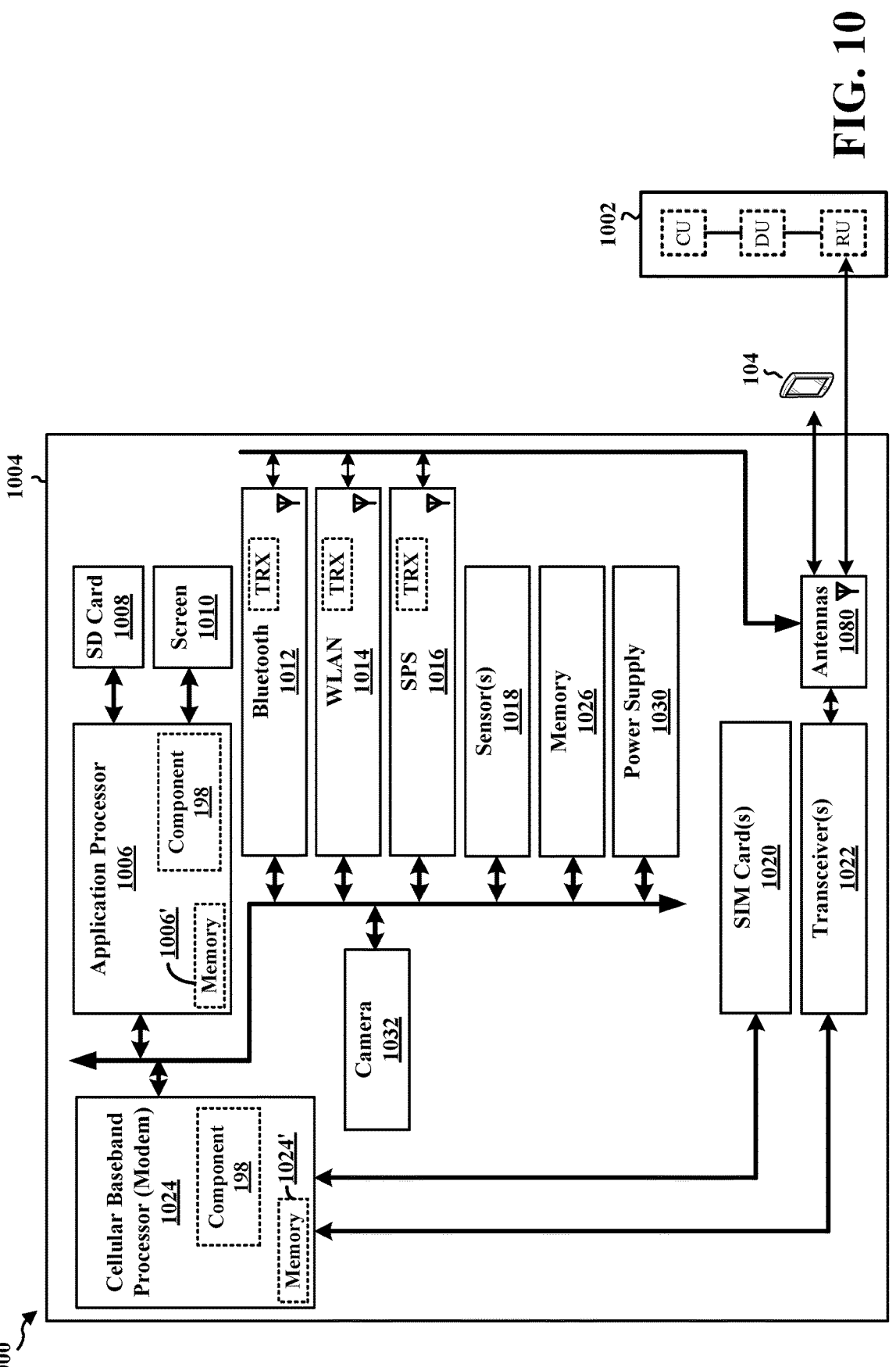
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be nontransitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the component 198 may be configured to select a positioning model from a set of positioning models supported by the wireless device based on a set of conditions of the wireless device satisfying a set of validity conditions associated with the selected positioning model. The component 198 may be configured to receive a set of positioning signals. The component 198 may be configured to measure the set of positioning signals. The component 198 may be configured to calculate, using the selected positioning model, a set of positioning results based on the measured set of positioning signals. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, may include means for selecting a model from a set of positioning models supported by the wireless device based on a set of conditions of the wireless device satisfying a set of validity conditions associated with the selected positioning model. The apparatus 1004 may include means for receiving a set of positioning signals. The method may include measuring the set of positioning signals. The apparatus 1004 may include means for calculating, using the selected positioning model, a set of positioning results based on the measured set of positioning signals. The set of validity conditions may include at least one of (a) a set of location attributes, (b) a set of deployment attributes, (c) a set of time periods, (d) a set of hardware limitations, (e) a set of resource attributes, (f) a set of RF signal propagation characteristics, or (g) a set of network identifiers. The set of location attributes may include at least one of (a) a latitude range, (b) a longitude range, or (c) an elevation range. The set of deployment attributes may include at least one of (a) a location bitmap, (b) an antenna height range, (c) an antenna setting, (d) a reflector density range, (e) a reflector size range, (f) a reflector relative elevation range, (g) a blocker density range, (h) a blocker size range, or (i) a blocker relative elevation range. The set of time periods may include at least one of (a) a first indicator of an expiration time, (b) a second indicator of a range of time, or (c) a third indicator of a periodic range of time. The set of hardware limitations may include at least one of (a) a first range of clock drift, (b) a first distribution of clock drift, (c) a second range of TX-RX timing errors, (d) a second distribution of TX-RX timing errors, (e) a third range of network synchronization errors, or (f) a third distribution of network synchronization errors. The set of resource attributes may include at least one of (a) a number of resources, (b) a resource bandwidth, or (c) a resource configuration. The set of RF signal propagation characteristics may include at least one of (a) a first range of channel delay spread, (b) a first distribution of channel delay spread, (c) a second range of Doppler spread, (d) a second distribution of Doppler spread, (e) a third range of angular spread, (f) a third distribution of angular spread, (g) a line-of-sight (LOS) peak width, or (h) a number of LOS peaks in a multipath profile. The set of network identifiers may include at least one of (a) a set of cell IDs, (b) a set of mobile network operators, (c) a set of network vendors. The apparatus 1004 may include means for receiving the set of validity conditions from an LMF prior to the selection of the positioning model. The apparatus 1004 may include means for receiving a request for a capability of the wireless device to select the positioning model from the set of positioning models based on a set of validity condition types. The apparatus 1004 may include means for transmitting an indication of whether the wireless device is configured to select the positioning model from the set of positioning models based on at least one of the set of validity condition types in response to receiving the request. The apparatus 1004 may include means for receiving the request by receiving at least one of an LPPa message including the request or an NRPPa message including the request. The apparatus 1004 may include means for receiving a second request for a plurality of sets of validity conditions that are associated with the set of positioning models and at least one of the set of validity condition types. The apparatus 1004 may include means for transmitting the plurality of sets of validity conditions in response to receiving the second request. The plurality of sets of validity conditions may include the set of validity conditions. The apparatus 1004 may include means for receiving a request for a plurality of sets of validity conditions associated with the set of positioning models supported by the wireless device. The apparatus 1004 may include means for transmitting the plurality of sets of validity conditions in response to the request. The plurality of sets of validity conditions may include the set of validity conditions. The apparatus 1004 may include means for receiving a request for a capability of the wireless device to select the positioning model from the set of positioning models based on a set of provided validity conditions. The apparatus 1004 may include means for transmitting an indication of whether the wireless device is configured to select the positioning model from the set of positioning models based on at least one of the set of provided validity conditions in response to receiving the request. The apparatus 1004 may include means for periodically transmitting a plurality of sets of validity conditions associated with the set of positioning models supported by the wireless device. The apparatus 1004 may include means for receiving an indication of a periodic timing. The apparatus 1004 may include means for periodically transmitting the plurality of sets of validity conditions by periodically transmitting the plurality of sets of validity conditions based on the periodic timing. The apparatus 1004 may include means for obtaining a second set of conditions associated with the wireless device. The second set of conditions may include a subset of the set of validity conditions. The apparatus 1004 may include means for transmitting a plurality of sets of validity conditions associated with the second set of conditions and the set of positioning models supported by the wireless device in response to the second set of conditions satisfying a threshold value. The apparatus 1004 may include means for receiving a variable associated with the threshold value. The apparatus 1004 may include means for detecting whether the second set of conditions satisfies the threshold value based on the variable. The variable may include at least one of a distance or an indication of a location. The apparatus 1004 may include means for detecting whether the second set of conditions satisfies the threshold value by detecting whether the wireless device is within the distance of the location. The variable may include a distance. The apparatus 1004 may include means for detecting whether the second set of conditions satisfies the threshold value by detecting whether the wireless device is within the distance of a location associated with at least one of the plurality of sets of validity conditions. The apparatus 1004 may include at least one of a UE, a network node, or a network entity. The positioning model may include an AIML model. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
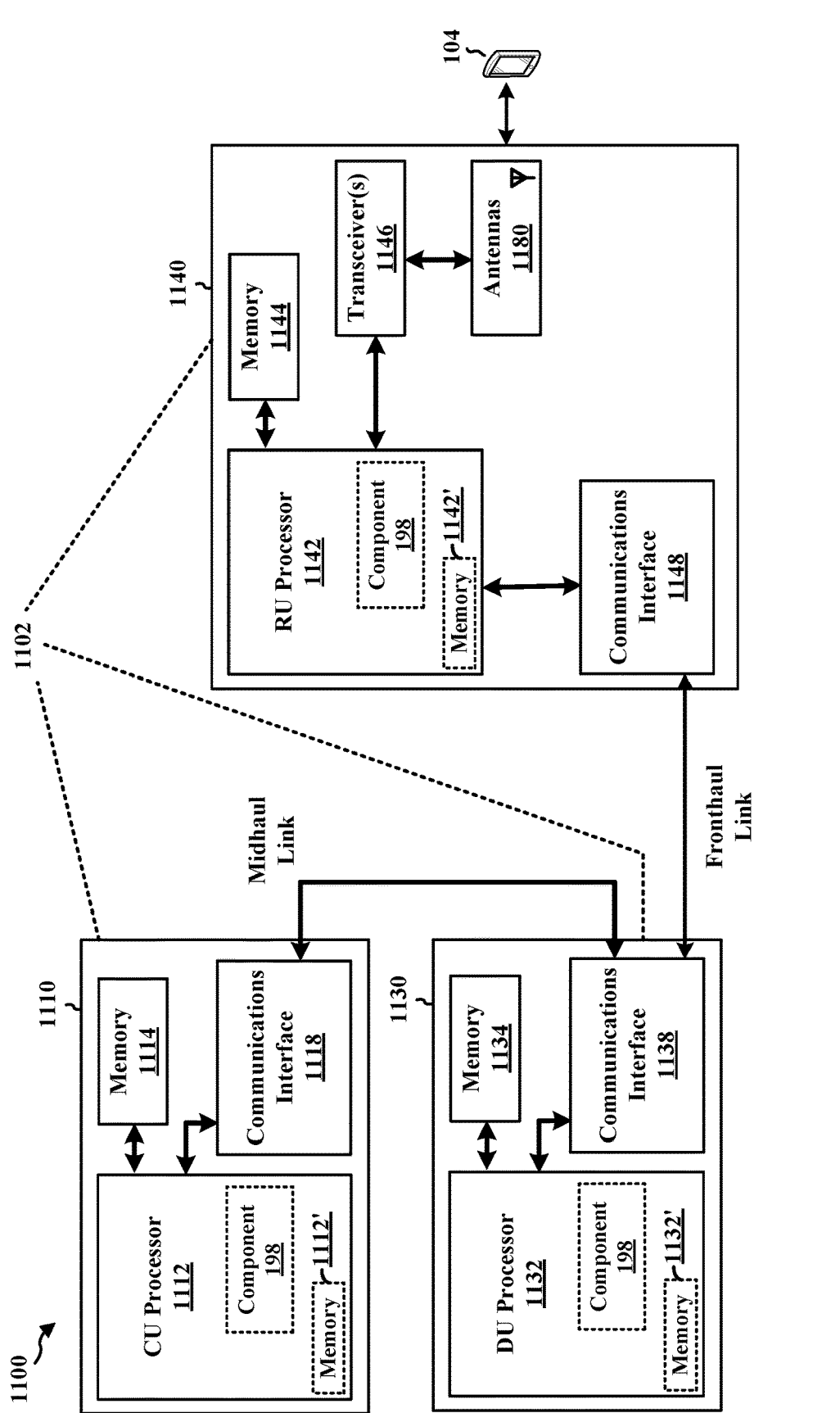
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 198, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to select a positioning model from a set of positioning models supported by the wireless device based on a set of conditions of the wireless device satisfying a set of validity conditions associated with the selected positioning model. The component 198 may be configured to receive a set of positioning signals. The component 198 may be configured to measure the set of positioning signals. The component 198 may be configured to calculate, using the selected positioning model, a set of positioning results based on the measured set of positioning signals. The component 198 may be within one or more processors of one or more of the CU 1110, DU 1130, and the RU 1140. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 may include means for selecting a model from a set of positioning models supported by the wireless device based on a set of conditions of the wireless device satisfying a set of validity conditions associated with the selected positioning model. The network entity 1102 may include means for receiving a set of positioning signals. The method may include measuring the set of positioning signals. The network entity 1102 may include means for calculating, using the selected positioning model, a set of positioning results based on the measured set of positioning signals. The set of validity conditions may include at least one of (a) a set of location attributes, (b) a set of deployment attributes, (c) a set of time periods, (d) a set of hardware limitations, (e) a set of resource attributes, (f) a set of RF signal propagation characteristics, or (g) a set of network identifiers. The set of location attributes may include at least one of (a) a latitude range, (b) a longitude range, or (c) an elevation range. The set of deployment attributes may include at least one of (a) a location bitmap, (b) an antenna height range, (c) an antenna setting, (d) a reflector density range, (e) a reflector size range, (f) a reflector relative elevation range, (g) a blocker density range, (h) a blocker size range, or (i) a blocker relative elevation range. The set of time periods may include at least one of (a) a first indicator of an expiration time, (b) a second indicator of a range of time, or (c) a third indicator of a periodic range of time. The set of hardware limitations may include at least one of (a) a first range of clock drift, (b) a first distribution of clock drift, (c) a second range of TX-RX timing errors, (d) a second distribution of TX-RX timing errors, (e) a third range of network synchronization errors, or (f) a third distribution of network synchronization errors. The set of resource attributes may include at least one of (a) a number of resources, (b) a resource bandwidth, or (c) a resource configuration. The set of RF signal propagation characteristics may include at least one of (a) a first range of channel delay spread, (b) a first distribution of channel delay spread, (c) a second range of Doppler spread, (d) a second distribution of Doppler spread, (e) a third range of angular spread, (f) a third distribution of angular spread, (g) a line-of-sight (LOS) peak width, or (h) a number of peaks (e.g., LOS peaks) in a multipath profile. The set of network identifiers may include at least one of (a) a set of cell IDs, (b) a set of mobile network operators, (c) a set of network vendors. The network entity 1102 may include means for receiving the set of validity conditions from an LMF prior to the selection of the positioning model. The network entity 1102 may include means for receiving a request for a capability of the wireless device to select the positioning model from the set of positioning models based on a set of validity condition types. The network entity 1102 may include means for transmitting an indication of whether the wireless device is configured to select the positioning model from the set of positioning models based on at least one of the set of validity condition types in response to receiving the request. The network entity 1102 may include means for receiving the request by receiving at least one of an LPPa message including the request or an NRPPa message including the request. The network entity 1102 may include means for receiving a second request for a plurality of sets of validity conditions that are associated with the set of positioning models and at least one of the set of validity condition types. The network entity 1102 may include means for transmitting the plurality of sets of validity conditions in response to receiving the second request. The plurality of sets of validity conditions may include the set of validity conditions. The network entity 1102 may include means for receiving a request for a plurality of sets of validity conditions associated with the set of positioning models supported by the wireless device. The network entity 1102 may include means for transmitting the plurality of sets of validity conditions in response to the request. The plurality of sets of validity conditions may include the set of validity conditions. The network entity 1102 may include means for receiving a request for a capability of the wireless device to select the positioning model from the set of positioning models based on a set of provided validity conditions. The network entity 1102 may include means for transmitting an indication of whether the wireless device is configured to select the positioning model from the set of positioning models based on at least one of the set of provided validity conditions in response to receiving the request. The network entity 1102 may include means for periodically transmitting a plurality of sets of validity conditions associated with the set of positioning models supported by the wireless device. The network entity 1102 may include means for receiving an indication of a periodic timing. The network entity 1102 may include means for periodically transmitting the plurality of sets of validity conditions by periodically transmitting the plurality of sets of validity conditions based on the periodic timing. The network entity 1102 may include means for obtaining a second set of conditions associated with the wireless device. The second set of conditions may include a subset of the set of validity conditions. The network entity 1102 may include means for transmitting a plurality of sets of validity conditions associated with the second set of conditions and the set of positioning models supported by the wireless device in response to the second set of conditions satisfying a threshold value. The network entity 1102 may include means for receiving a variable associated with the threshold value. The network entity 1102 may include means for detecting whether the second set of conditions satisfies the threshold value based on the variable. The variable may include at least one of a distance or an indication of a location. The network entity 1102 may include means for detecting whether the second set of conditions satisfies the threshold value by detecting whether the wireless device is within the distance of the location. The variable may include a distance. The network entity 1102 may include means for detecting whether the second set of conditions satisfies the threshold value by detecting whether the wireless device is within the distance of a location associated with at least one of the plurality of sets of validity conditions. The positioning model may include an AIML model. The means may be the component 198 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

Figure 12:
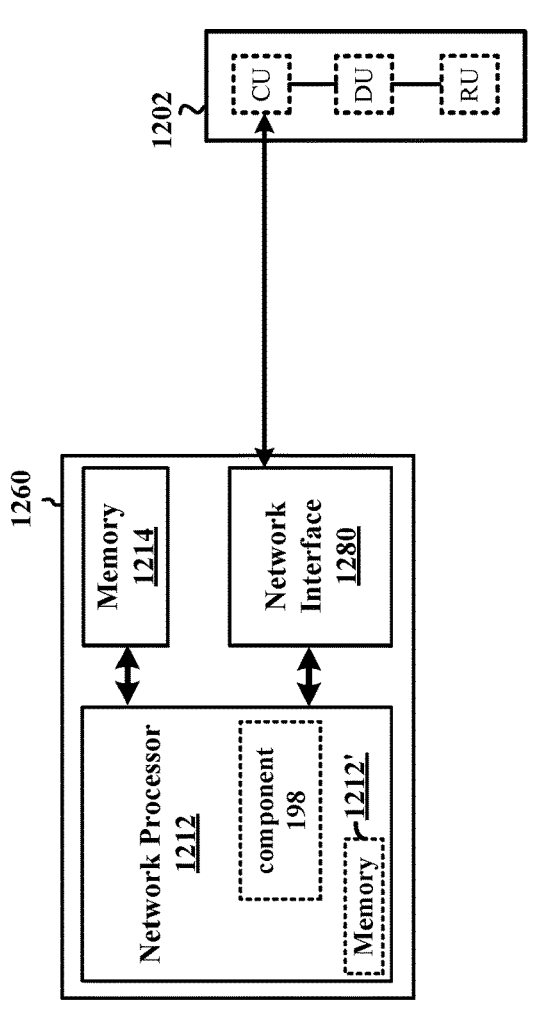
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to select a positioning model from a set of positioning models supported by the wireless device based on a set of conditions of the wireless device satisfying a set of validity conditions associated with the selected positioning model. The component 198 may be configured to receive a set of positioning signals. The component 198 may be configured to measure the set of positioning signals. The component 198 may be configured to calculate, using the selected positioning model, a set of positioning results based on the measured set of positioning signals. The component 198 may be within the processor 1212. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 may include means for selecting a model from a set of positioning models supported by the wireless device based on a set of conditions of the wireless device satisfying a set of validity conditions associated with the selected positioning model. The network entity 1260 may include means for receiving a set of positioning signals. The network entity 1260 may include means for measuring the set of positioning signals.

The network entity 1260 may include means for calculating, using the selected positioning model, a set of positioning results based on the measured set of positioning signals. The set of validity conditions may include at least one of (a) a set of location attributes, (b) a set of deployment attributes, (c) a set of time periods, (d) a set of hardware limitations, (e) a set of resource attributes, (f) a set of RF signal propagation characteristics, or (g) a set of network identifiers. The set of location attributes may include at least one of (a) a latitude range, (b) a longitude range, or (c) an elevation range. The set of deployment attributes may include at least one of (a) a location bitmap, (b) an antenna height range, (c) an antenna setting, (d) a reflector density range, (e) a reflector size range, (f) a reflector relative elevation range, (g) a blocker density range, (h) a blocker size range, or (i) a blocker relative elevation range. The set of time periods may include at least one of (a) a first indicator of an expiration time, (b) a second indicator of a range of time, or (c) a third indicator of a periodic range of time. The set of hardware limitations may include at least one of (a) a first range of clock drift, (b) a first distribution of clock drift, (c) a second range of TX-RX timing errors, (d) a second distribution of TX-RX timing errors, (e) a third range of network synchronization errors, or (f) a third distribution of network synchronization errors. The set of resource attributes may include at least one of (a) a number of resources, (b) a resource bandwidth, or (c) a resource configuration. The set of RF signal propagation characteristics may include at least one of (a) a first range of channel delay spread, (b) a first distribution of channel delay spread, (c) a second range of Doppler spread, (d) a second distribution of Doppler spread, (e) a third range of angular spread, (f) a third distribution of angular spread, (g) a line-of-sight (LOS) peak width, or (h) a number of peaks (e.g., LOS peaks) in a multipath profile. The set of network identifiers may include at least one of (a) a set of cell IDs, (b) a set of mobile network operators, (c) a set of network vendors. The network entity 1260 may include means for receiving the set of validity conditions from an LMF prior to the selection of the positioning model. The network entity 1260 may include means for receiving a request for a capability of the wireless device to select the positioning model from the set of positioning models based on a set of validity condition types. The network entity 1260 may include means for transmitting an indication of whether the wireless device is configured to select the positioning model from the set of positioning models based on at least one of the set of validity condition types in response to receiving the request. The network entity 1260 may include means for receiving the request by receiving at least one of an LPPa message including the request or an NRPPa message including the request. The network entity 1260 may include means for receiving a second request for a plurality of sets of validity conditions that are associated with the set of positioning models and at least one of the set of validity condition types. The network entity 1260 may include means for transmitting the plurality of sets of validity conditions in response to receiving the second request. The plurality of sets of validity conditions may include the set of validity conditions. The network entity 1260 may include means for receiving a request for a plurality of sets of validity conditions associated with the set of positioning models supported by the wireless device. The network entity 1260 may include means for transmitting the plurality of sets of validity conditions in response to the request. The plurality of sets of validity conditions may include the set of validity conditions. The network entity 1260 may include means for receiving a request for a capability of the wireless device to select the positioning model from the set of positioning models based on a set of provided validity conditions. The network entity 1260 may include means for transmitting an indication of whether the wireless device is configured to select the positioning model from the set of positioning models based on at least one of the set of provided validity conditions in response to receiving the request. The network entity 1260 may include means for periodically transmitting a plurality of sets of validity conditions associated with the set of positioning models supported by the wireless device. The network entity 1260 may include means for receiving an indication of a periodic timing. The network entity 1260 may include means for periodically transmitting the plurality of sets of validity conditions by periodically transmitting the plurality of sets of validity conditions based on the periodic timing. The network entity 1260 may include means for obtaining a second set of conditions associated with the wireless device. The second set of conditions may include a subset of the set of validity conditions. The network entity 1260 may include means for transmitting a plurality of sets of validity conditions associated with the second set of conditions and the set of positioning models supported by the wireless device in response to the second set of conditions satisfying a threshold value. The network entity 1260 may include means for receiving a variable associated with the threshold value. The network entity 1260 may include means for detecting whether the second set of conditions satisfies the threshold value based on the variable. The variable may include at least one of a distance or an indication of a location. The network entity 1260 may include means for detecting whether the second set of conditions satisfies the threshold value by detecting whether the wireless device is within the distance of the location. The variable may include a distance. The network entity 1260 may include means for detecting whether the second set of conditions satisfies the threshold value by detecting whether the wireless device is within the distance of a location associated with at least one of the plurality of sets of validity conditions. The positioning model may include an AIML model. The means may be the component 198 of the network entity 1260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive the data, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, wherein the method comprises selecting a model from a set of positioning models supported by the wireless device based on a set of conditions of the wireless device satisfying a set of validity conditions associated with the selected positioning model. The method comprises receiving a set of positioning signals. The method comprises measuring the set of positioning signals. The method comprises calculating, using the selected positioning model, a set of positioning results based on the measured set of positioning signals.

Aspect 2 is the method of aspect 1, wherein the set of validity conditions comprises at least one of (a) a set of location attributes, (b) a set of deployment attributes, (c) a set of time periods, (d) a set of hardware limitations, (e) a set of resource attributes, (f) a set of radio frequency (RF) signal propagation characteristics, or (g) a set of network identifiers.

Aspect 3 is the method of aspect 2, wherein the set of location attributes comprises at least one of (a) a latitude range, (b) a longitude range, or (c) an elevation range.

Aspect 4 is the method of either of aspects 2 or 3, wherein the set of deployment attributes comprises at least one of (a) a location bitmap, (b) an antenna height range, (c) an antenna setting, (d) a reflector density range, (e) a reflector size range, (f) a reflector relative elevation range, (g) a blocker density range, (h) a blocker size range, or (i) a blocker relative elevation range.

Aspect 5 is the method of any of aspects 2 to 4, wherein the set of time periods comprises at least one of (a) a first indicator of an expiration time, (b) a second indicator of a range of time, or (c) a third indicator of a periodic range of time.

Aspect 6 is the method of any of aspects 2 to 5, wherein the set of hardware limitations comprises at least one of (a) a first range of clock drift, (b) a first distribution of clock drift, (c) a second range of transmission (TX) reception (TX-RX) timing errors, (d) a second distribution of TX-RX timing errors, (e) a third range of network synchronization errors, or (f) a third distribution of network synchronization errors.

Aspect 7 is the method of any of aspects 2 to 6, wherein the set of resource attributes comprises at least one of (a) a number of resources, (b) a resource bandwidth, or (c) a resource configuration.

Aspect 8 is the method of any of aspects 2 to 7, wherein the set of RF signal propagation characteristics comprises at least one of (a) a first range of channel delay spread, (b) a first distribution of channel delay spread, (c) a second range of Doppler spread, (d) a second distribution of Doppler spread, (e) a third range of angular spread, (f) a third distribution of angular spread, (g) a line-of-sight (LOS) peak width, or (h) a number of LOS peaks in a multipath profile.

Aspect 9 is the method of any of aspects 2 to 8, wherein the set of network identifiers comprises at least one of (a) a set of cell identifiers (IDs), (b) a set of mobile network operators, (c) a set of network vendors.

Aspect 10 is the method of any of aspects 1 to 9, wherein the method comprises receiving the set of validity conditions from an location management function (LMF) prior to the selection of the positioning model.

Aspect 11 is the method of any of aspects 1 to 10, wherein the method comprises receiving a request for a capability of the wireless device to select the positioning model from the set of positioning models based on a set of validity condition types. The method comprises transmitting an indication of whether the wireless device is configured to select the positioning model from the set of positioning models based on at least one of the set of validity condition types in response to receiving the request.

Aspect 12 is the method of aspect 11, wherein receiving the request comprises receiving at least one of a long-term evolution (LTE) positioning protocol (LPP) annex (LPPa) message comprising the request or a new radio (NR) positioning protocol (NRPP) annex (NRPPa) message comprising the request.

Aspect 13 is the method of either of aspects 11 or 12, wherein the method comprises receiving a second request for a plurality of sets of validity conditions that are associated with the set of positioning models and at least one of the set of validity condition types. The method comprises transmitting the plurality of sets of validity conditions in response to receiving the second request, wherein the plurality of sets of validity conditions comprises the set of validity conditions.

Aspect 14 is the method of any of aspects 1 to 13, wherein the method comprises receiving a request for a plurality of sets of validity conditions associated with the set of positioning models supported by the wireless device. The method comprises transmitting the plurality of sets of validity conditions in response to the request, wherein the plurality of sets of validity conditions comprises the set of validity conditions.

Aspect 15 is the method of any of aspects 1 to 14, wherein the method comprises receiving a request for a capability of the wireless device to select the positioning model from the set of positioning models based on a set of provided validity conditions. The method comprises transmitting an indication of whether the wireless device is configured to select the positioning model from the set of positioning models based on at least one of the set of provided validity conditions in response to receiving the request.

Aspect 16 is the method of any of aspects 1 to 15, wherein the method comprises periodically transmitting a plurality of sets of validity conditions associated with the set of positioning models supported by the wireless device.

Aspect 17 is the method of aspect 16, wherein the method comprises receiving an indication of a periodic timing, wherein periodically transmitting the plurality of sets of validity conditions comprises periodically transmitting the plurality of sets of validity conditions based on the periodic timing.

Aspect 18 is the method of any of aspects 1 to 17, wherein the method comprises obtaining a second set of conditions associated with the wireless device, wherein the second set of conditions comprises a subset of the set of validity conditions. The method comprises transmitting a plurality of sets of validity conditions associated with the second set of conditions and the set of positioning models supported by the wireless device in response to the second set of conditions satisfying a threshold value.

Aspect 19 is the method of aspect 18, wherein the method comprises receiving a variable associated with the threshold value. The method comprises detecting whether the second set of conditions satisfies the threshold value based on the variable.

Aspect 20 is the method of aspect 19, wherein the variable comprises at least one of a distance or an indication of a location, wherein detecting whether the second set of conditions satisfies the threshold value comprises detecting whether the wireless device is within the distance of the location.

Aspect 21 is the method of either of aspects 20 or 21, wherein the variable comprises a distance, wherein detecting whether the second set of conditions satisfies the threshold value comprises detecting whether the wireless device is within the distance of a location associated with at least one of the plurality of sets of validity conditions.

Aspect 22 is the method of any of aspects 1 to 21, wherein the wireless device comprises at least one of a user equipment (UE), a network node, or a network entity.

Aspect 23 is the method of any of aspects 1 to 22, wherein the positioning model comprises an artificial intelligence machine learning (AIML) model.

Aspect 24 is the method of any of aspects 1 to 23, wherein the method comprises receiving the set of validity conditions from a network node prior to the selection of the positioning model.

Aspect 25 is the method of aspect 24, wherein the network node comprises a base station serving the UE or an LMF.

Aspect 26 is an apparatus for wireless communication, including: a memory; and at least one processor coupled to the memory and, based at least in part on information stored in the memory, the at least one processor is configured to implement any of aspects 1 to 25.

Aspect 27 is the apparatus of aspect 26, further including at least one of an antenna or a transceiver coupled to the at least one processor.

Aspect 28 is an apparatus for wireless communication including means for implementing any of aspects 1 to 25.

Aspect 29 is a computer-readable medium (e.g., a non-transitory computer-readable medium) storing computer executable code, wherein the code when executed by a processor causes the processor to implement any of aspects 1 to 25.

Aspect 30 is a computer-readable medium storing computer executable code at a wireless device. The code when executed by a processor causes the processor to select a positioning model from a set of positioning models supported by the wireless device based on a set of conditions of the wireless device satisfying a set of validity conditions associated with the selected positioning model. The code when executed by a processor causes the processor to receive a set of positioning signals. The code when executed by a processor causes the processor to measure the set of positioning signals. The code when executed by a processor causes the processor to calculate, using the selected positioning model, a set of positioning results based on the measured set of positioning signals.

Aspect 31 is the method of aspect 10, wherein the network node comprises a base station serving the wireless device or a location management function (LMF).

What is claimed is:

1. An apparatus for wireless communication at a wireless device, comprising:
 memory; and
 at least one processor coupled to the memory and, based at least in part on information stored in the memory, the at least one processor is configured to:
   select a positioning model from a set of positioning models supported by the wireless device based on a set of conditions of the wireless device satisfying a set of validity conditions associated with the selected positioning model, wherein the satisfied set of validity conditions comprises at least one of (a) a set of time periods, (b) a set of hardware limitations, (c) a set of resource attributes, or (d) a set of base station identifiers;
   receive a set of positioning signals;
   measure the set of positioning signals;
   calculate, using the selected positioning model, a set of positioning results based on the measured set of positioning signals;

receive a request for a capability of the wireless device to select the positioning model from the set of positioning models based on a set of validity condition types; and
   transmit an indication of whether the wireless device is configured to select the positioning model from the set of positioning models based on at least one of the set of validity condition types in response to receiving the request.

2. The apparatus of claim 1, wherein the satisfied set of validity conditions further comprises at least one of:
 a set of location attributes;
 a set of deployment attributes; or
 a set of radio frequency (RF) signal propagation characteristics.

3. The apparatus of claim 2, wherein the set of location attributes comprises at least one of:
 a latitude range;
 a longitude range; or
 an elevation range.

4. The apparatus of claim 2, wherein the set of deployment attributes comprises at least one of:
 a location bitmap;
 an antenna elevation range;
 an antenna setting;
 a reflector density range;
 a reflector size range;
 a reflector relative elevation range;
 a blocker density range;
 a blocker size range; or
 a blocker relative elevation range.

5. The apparatus of claim 2, wherein the set of RF signal propagation characteristics comprises at least one of:
 a first range of channel delay spread;
 a first distribution of channel delay spread;
 a second range of Doppler spread;
 a second distribution of Doppler spread;
 a third range of angular spread;
 a third distribution of angular spread;
 a line-of-sight (LOS) peak width; or
 a number of LOS peaks in a multipath profile.

6. The apparatus of claim 1, wherein the set of time periods comprises at least one of:
 a first indicator of an expiration time;
 a second indicator of a range of time; or
 a third indicator of a periodic range of time.

7. The apparatus of claim 1, wherein the set of hardware limitations comprises at least one of:
 a first range of clock drift;
 a first distribution of clock drift;
 a second range of transmission (TX) reception (TX-RX) timing errors;
 a second distribution of TX-RX timing errors;
 a third range of network synchronization errors; or
 a third distribution of network synchronization errors.

8. The apparatus of claim 1, wherein the set of resource attributes comprises at least one of:
 a number of resources;
 a resource bandwidth; or
 a resource configuration.

9. The apparatus of claim 1, wherein the set of base station identifiers comprises at least one of:
 a set of cell identifiers (IDs);
 a set of mobile network operators; or
 a set of network vendors.

10. The apparatus of claim 1, wherein the at least one processor is further configured to:

receive the set of validity conditions from a network node prior to the selection of the positioning model.

11. The apparatus of claim 10, wherein the network node comprises a base station serving the wireless device or a location management function (LMF).

12. The apparatus of claim 1, wherein, to receive the request, the at least one processor is configured to:

receive at least one of a long-term evolution (LTE) positioning protocol (LPP) annex (LPPa) message comprising the request or a new radio (NR) positioning protocol (NRPP) annex (NRPPa) message comprising the request.

13. The apparatus of claim 1, wherein the at least one processor is further configured to:

receive a second request for a plurality of sets of validity conditions that are associated with the set of positioning models and at least one of the set of validity condition types; and transmit the plurality of sets of validity conditions in response to receiving the second request, wherein the plurality of sets of validity conditions comprises the set of validity conditions.

14. The apparatus of claim 1, wherein the at least one processor is further configured to:

receive a request for a plurality of sets of validity conditions associated with the set of positioning models supported by the wireless device; and transmit the plurality of sets of validity conditions in response to the request, wherein the plurality of sets of validity conditions comprises the set of validity conditions.

15. The apparatus of claim 1, wherein the at least one processor is further configured to:

receive a request for a capability of the wireless device to select the positioning model from the set of positioning models based on a set of provided validity conditions; and transmit an indication of whether the wireless device is configured to select the positioning model from the set of positioning models based on at least one of the set of provided validity conditions in response to receiving the request.

16. The apparatus of claim 1, wherein the at least one processor is further configured to:

periodically transmit a plurality of sets of validity conditions associated with the set of positioning models supported by the wireless device.

17. The apparatus of claim 16, wherein the at least one processor is further configured to:

receive an indication of a periodic timing, wherein, to periodically transmit the plurality of sets of validity conditions, the at least one processor is configured to: periodically transmit the plurality of sets of validity conditions based on the periodic timing.

18. The apparatus of claim 1, wherein the at least one processor is further configured to:

obtain a second set of conditions associated with the wireless device, wherein the second set of conditions comprises a subset of the set of validity conditions; and transmit a plurality of sets of validity conditions associated with the second set of conditions and the set of positioning models supported by the wireless device in response to the second set of conditions satisfying a threshold value.

19. The apparatus of claim 18, wherein, to transmit the plurality of sets of validity conditions, the at least one processor is configured to:

receive a variable associated with the threshold value; and detect whether the second set of conditions satisfies the threshold value based on the variable.

20. The apparatus of claim 19, wherein the variable comprises at least one of a distance or an indication of a location, wherein, to detect whether the second set of conditions satisfies the threshold value, the at least one processor is configured to:

detect whether the wireless device is within the distance of the location.

21. The apparatus of claim 19, wherein the variable comprises a distance, and wherein, to detect whether the second set of conditions satisfies the threshold value, the at least one processor is configured to:

detect whether the wireless device is within the distance of a location associated with at least one of the plurality of sets of validity conditions.

22. The apparatus of claim 1, wherein the wireless device comprises at least one of a user equipment (UE), a network node, or a network entity.

23. The apparatus of claim 1, wherein the positioning model comprises an artificial intelligence machine learning (AIML) model.

24. The apparatus of claim 1, further comprising a transceiver coupled to the at least one processor, wherein, to receive the set of positioning signals, the at least one processor is configured to receive, via the transceiver, the set of positioning signals.

25. A method of wireless communication at a wireless device, comprising:

selecting a positioning model from a set of positioning models supported by the wireless device based on a set of conditions of the wireless device satisfying a set of validity conditions associated with the selected positioning model, wherein the satisfied set of validity conditions comprises at least one of (a) a set of time periods, (b) a set of hardware limitations, (c) a set of resource attributes, or (d) a set of base station identifiers;

receiving a set of positioning signals;

measuring the set of positioning signals;

calculating, using the selected positioning model, a set of positioning results based on the measured set of positioning signals;

receiving a request for a capability of the wireless device to select the positioning model from the set of positioning models based on a set of validity condition types; and transmitting an indication of whether the wireless device is configured to select the positioning model from the set of positioning models based on at least one of the set of validity condition types in response to receiving the request.

26. The method of claim 25, further comprising:

obtaining a second set of conditions associated with the wireless device, wherein the second set of conditions comprises a subset of the set of validity conditions; and transmitting a plurality of sets of validity conditions associated with the second set of conditions and the set of positioning models supported by the wireless device in response to the second set of conditions satisfying a threshold value.

27. An apparatus for wireless communication at a wireless device, comprising:

means for selecting a positioning model from a set of positioning models supported by the wireless device based on a set of conditions of the wireless device satisfying a set of validity conditions associated with the selected positioning model, wherein the satisfied set of validity conditions comprises at least one of (a) a set of time periods, (b) a set of hardware limitations, (c) a set of resource attributes, or (d) a set of base station identifiers;

means for receiving a set of positioning signals;

means for measuring the set of positioning signals;

means for calculating, using the selected positioning model, a set of positioning results based on the measured set of positioning signals;

means for receiving a request for a capability of the wireless device to select the positioning model from the set of positioning models based on a set of validity condition types; and means for transmitting an indication of whether the wireless device is configured to select the positioning model from the set of positioning models based on at least one of the set of validity condition types in response to receiving the request.

28. A non-transitory computer-readable medium storing computer executable code at a wireless device, the code when executed by a processor causes the processor to:

50 select a positioning model from a set of positioning models supported by the wireless device based on a set of conditions of the wireless device satisfying a set of validity conditions associated with the selected positioning model, wherein the satisfied set of validity conditions comprises at least one of (a) a set of time periods, (b) a set of hardware limitations, (c) a set of resource attributes, or (d) a set of base station identifiers;

receive a set of positioning signals;

measure the set of positioning signals;

calculate, using the selected positioning model, a set of positioning results based on the measured set of positioning signals;

receive a request for a capability of the wireless device to select the positioning model from the set of positioning models based on a set of validity condition types; and transmit an indication of whether the wireless device is configured to select the positioning model from the set of positioning models based on at least one of the set of validity condition types in response to receiving the request.

* * * * *